United States Patent
Elazzouni et al.

(10) Patent No.: US 12,114,393 B2
(45) Date of Patent: Oct. 8, 2024

(54) SIDELINK FOR INDUSTRIAL IOT

(71) Applicant: QUALCOMM Incorporated, San Diego, CA (US)

(72) Inventors: Sherif Elazzouni, San Diego, CA (US); Ozcan Ozturk, San Diego, CA (US); Rajat Prakash, San Diego, CA (US); Fatih Ulupinar, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 17/308,379

(22) Filed: May 5, 2021

(65) Prior Publication Data
US 2022/0360964 A1  Nov. 10, 2022

(51) Int. Cl.
| | | |
|---|---|---|
| *H04W 8/00* | (2009.01) | |
| *H04B 17/318* | (2015.01) | |
| *H04W 24/10* | (2009.01) | |
| *H04W 28/24* | (2009.01) | |
| *H04W 80/02* | (2009.01) | |
| *H04W 92/18* | (2009.01) | |

(52) U.S. Cl.
CPC .......... *H04W 8/005* (2013.01); *H04B 17/318* (2015.01); *H04W 24/10* (2013.01); *H04W 28/24* (2013.01); *H04W 80/02* (2013.01); *H04W 92/18* (2013.01)

(58) Field of Classification Search
CPC ..... H04W 8/005; H04W 24/10; H04W 28/24; H04W 80/02; H04W 92/18; H04B 17/318
See application file for complete search history.

(56) References Cited

U.S. PATENT DOCUMENTS

| | | | |
|---|---|---|---|
| 2011/0319071 A1* | 12/2011 | Beppler ............... | H04W 48/18 455/424 |
| 2012/0057489 A1* | 3/2012 | Shiotsuki ............. | H04W 40/12 370/252 |
| 2014/0044024 A1* | 2/2014 | Zou ...................... | H04W 76/14 370/280 |
| 2020/0314772 A1* | 10/2020 | Roth-Mandutz ...... | H04W 76/50 |
| 2021/0153262 A1* | 5/2021 | Mochizuki .......... | H04W 74/006 |

* cited by examiner

*Primary Examiner* — Joseph A Bednash
(74) *Attorney, Agent, or Firm* — Procopio, Cory, Hargreaves & Savitch LLP

(57) ABSTRACT

Apparatus, methods, and computer program products for relaying and side link communication are provided. An example method may include receiving, from a BS via a controlled discovery procedure, a query to verify a sidelink procedure with at least one UE. The example method may further include establishing, via the BS as a L2 relay, the sidelink procedure with the at least one UE. The example method may further include switching from the sidelink procedure to a sidelink PDCP procedure with a hybrid mode, the BS being an L2 relay for the sidelink PDCP procedure. The example method may further include transmitting to the at least one UE via the BS as the L2 relay, or receiving, from the at least one UE via the BS as an L2 relay, one or more PDCP PDUs corresponding to L2.

30 Claims, 25 Drawing Sheets

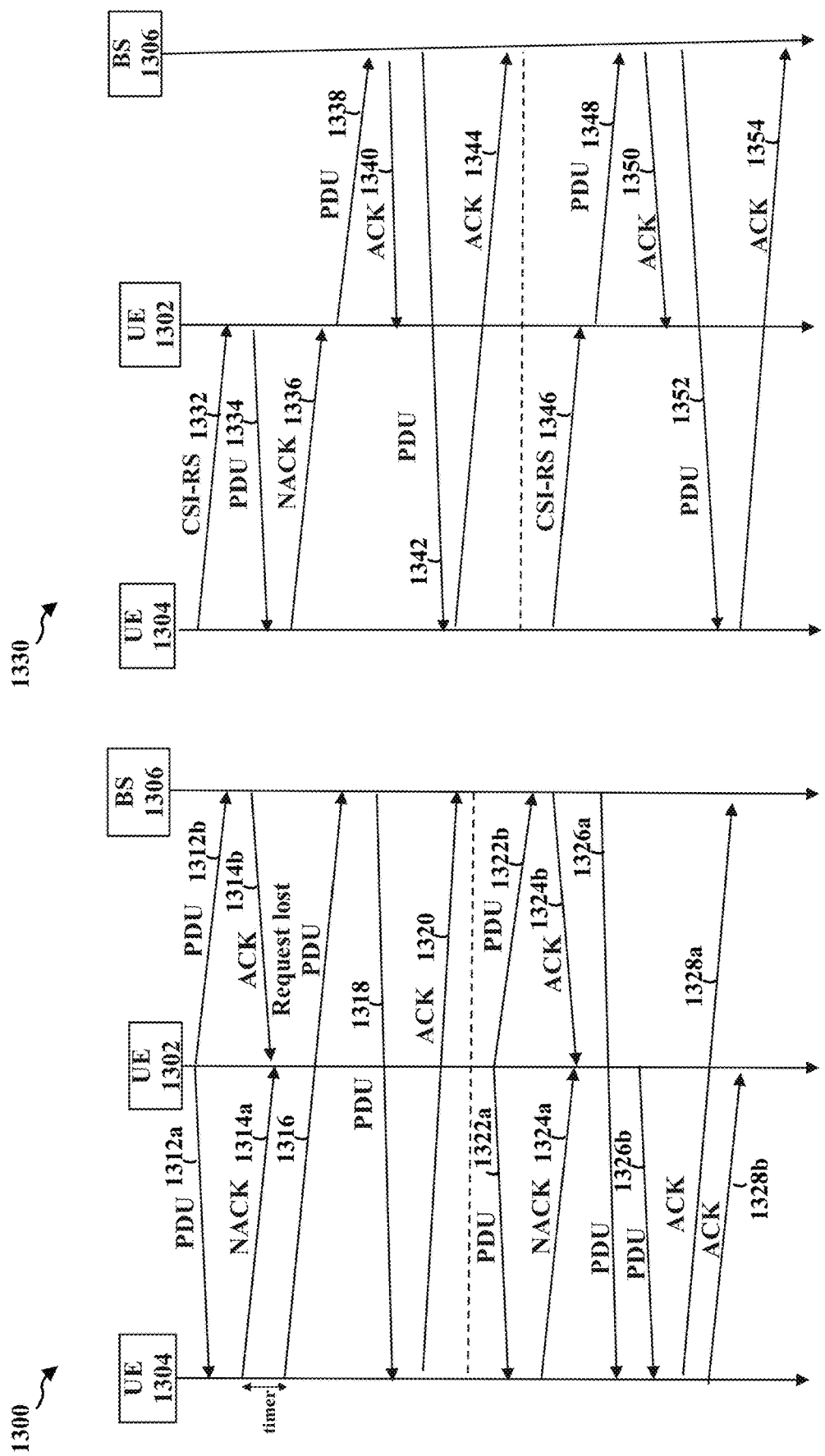

SIDELINK FOR INDUSTRIAL IOT

BACKGROUND

Technical Field

The present disclosure relates generally to communication systems, and more particularly, to wireless communication systems with sidelink (SL) communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The UE may be configured to receive, from a base station (BS) via a controlled discovery procedure, a query to verify a sidelink procedure with at least one UE. The UE may be further configured to establish, via the base station as a layer 2 (L2) relay, a sidelink procedure with the at least one UE. The UE may be further configured to switch from the sidelink procedure to a sidelink packet data convergence protocol (PDCP) procedure with a hybrid mode, the base station being an L2 relay for the sidelink PDCP procedure. The UE may be further configured to transmit to the at least one UE via the BS as the L2 relay, or receive, from the at least one UE via the BS as an L2 relay, one or more PDCP protocol data unit (PDUs) corresponding to L2, the one or more PDCP PDUs being transmitted or received via an adaptation layer at the BS.

In another aspect of the disclosure, a method, a computer-readable medium, and an apparatus at a base station may be provided. The base station may be configured to transmit, to at least one first UE via a controlled discovery procedure, a query to verify a SL procedure with at least one second UE. The base station may be further configured to establish, as a L2 relay, a SL procedure between the at least one first UE and the at least one second UE. The base station may be further configured to switch from the SL procedure to a SL PDCP procedure with a hybrid mode, wherein the BS is an L2 relay for the SL PDCP procedure with the hybrid mode. The base station may be further configured to receive, from the at least one first UE or the at least one second UE as an L2 relay, one or more PDCP PDUs corresponding to L2, and transmit, to the at least one second UE or the at least one first UE as an L2 relay, the one or more PDCP PDUs corresponding to L2, the one or more PDCP PDUs being received/transmitted via an adaptation layer at the BS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 13A-13C illustrate examples of hybrid mode switching.

DETAILED DESCRIPTION

Figure 1:
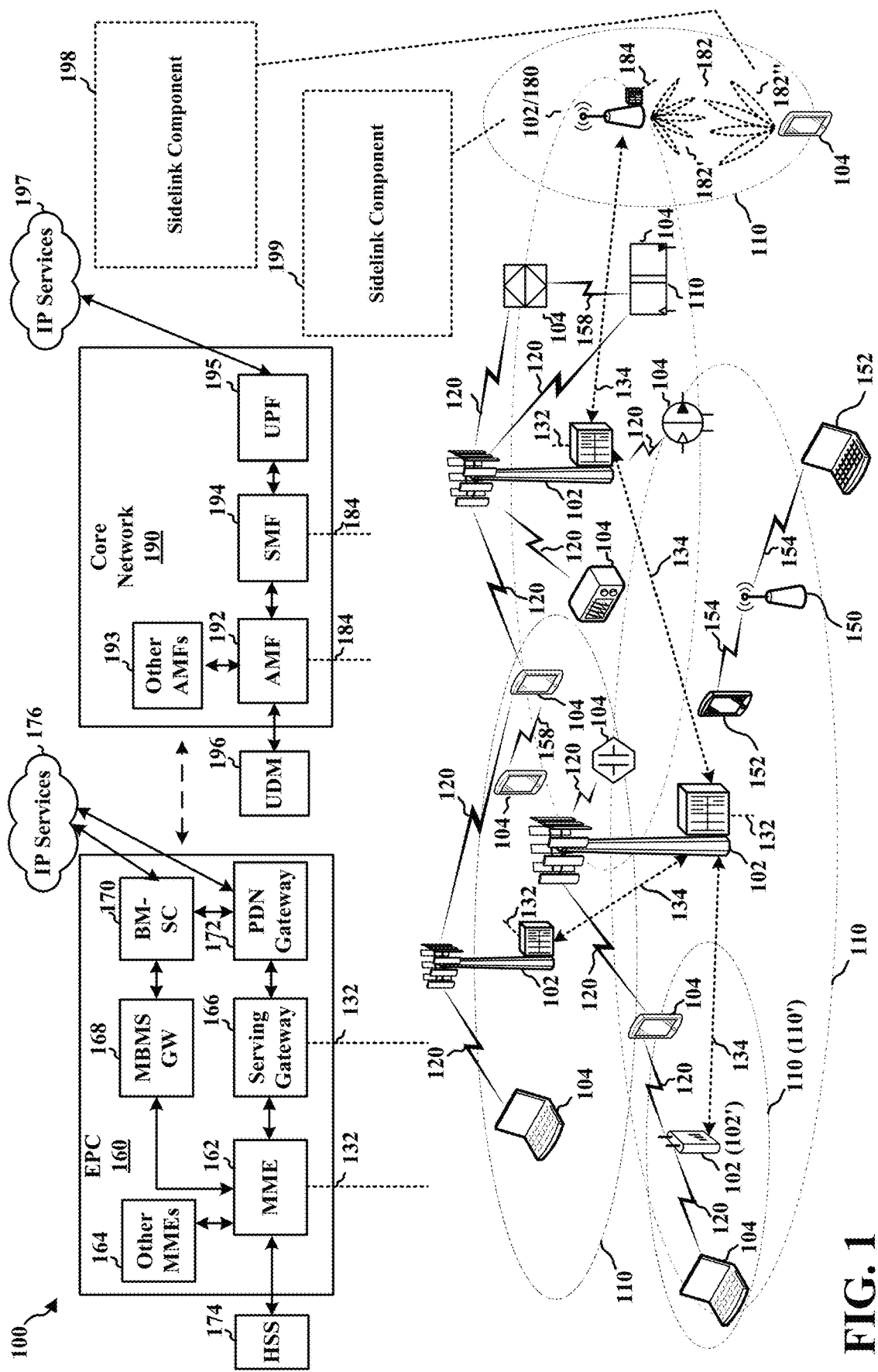
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink (SL). For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR. The sidelink communications may include UEs in the form of PLCs, S/As, human machine interface (HMIs), management system, or other industrial Internet of Things (IIoT) related UEs.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or other D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for sidelink communication in connection with 5G NR, the concepts described herein may be applicable to other similar areas, such as LTE, LTE-A, CDMA, GSM, and other wireless technologies.

Referring again to FIG. 1, a UE 104 that may be a PLC, a S/A, or other sidelink devices may include a sidelink component 198. The sidelink component 198 may be configured to receive, from a base station such as the base station 102, via a controlled discovery procedure, a query to verify a sidelink procedure with at least one UE, such as another UE 104. The sidelink component 198 may be further configured to establish, via the base station as a layer 2 (L2) relay, a sidelink procedure with the at least one UE. The sidelink component 198 may be further configured to switch from the sidelink procedure to a sidelink packet data convergence protocol (PDCP) procedure with a hybrid mode, the base station being an L2 relay for the sidelink PDCP procedure. The sidelink component 198 may be further configured to transmit to the at least one UE via the BS as the L2 relay, or receive, from the at least one UE via the BS as an L2 relay, one or more PDCP protocol data unit (PDUs) corresponding to L2, the one or more PDCP PDUs being transmitted or received via an adaptation layer at the BS.

The base station 102 may include a sidelink component 199. The sidelink component 199 may be configured to transmit, to at least one first UE via a controlled discovery procedure, a query to verify a SL procedure with at least one second UE. The sidelink component 199 may be further configured to establish, as a L2 relay, a SL procedure between the at least one first UE and the at least one second UE. The sidelink component 199 may be further configured to switch from the SL procedure to a SL PDCP procedure with a hybrid mode, the BS being an L2 relay for the SL PDCP procedure with the hybrid mode. The sidelink component 199 may be further configured to receive, from the at least one first UE or the at least one second UE as an L2 relay, one or more PDCP PDUs corresponding to L2, and transmit, to the at least one second UE or the at least one first UE as an L2 relay, the one or more PDCP PDUs corresponding to L2, the one or more PDCP PDUs being received/transmitted via an adaptation layer at the BS.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on V2X, V2V, or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
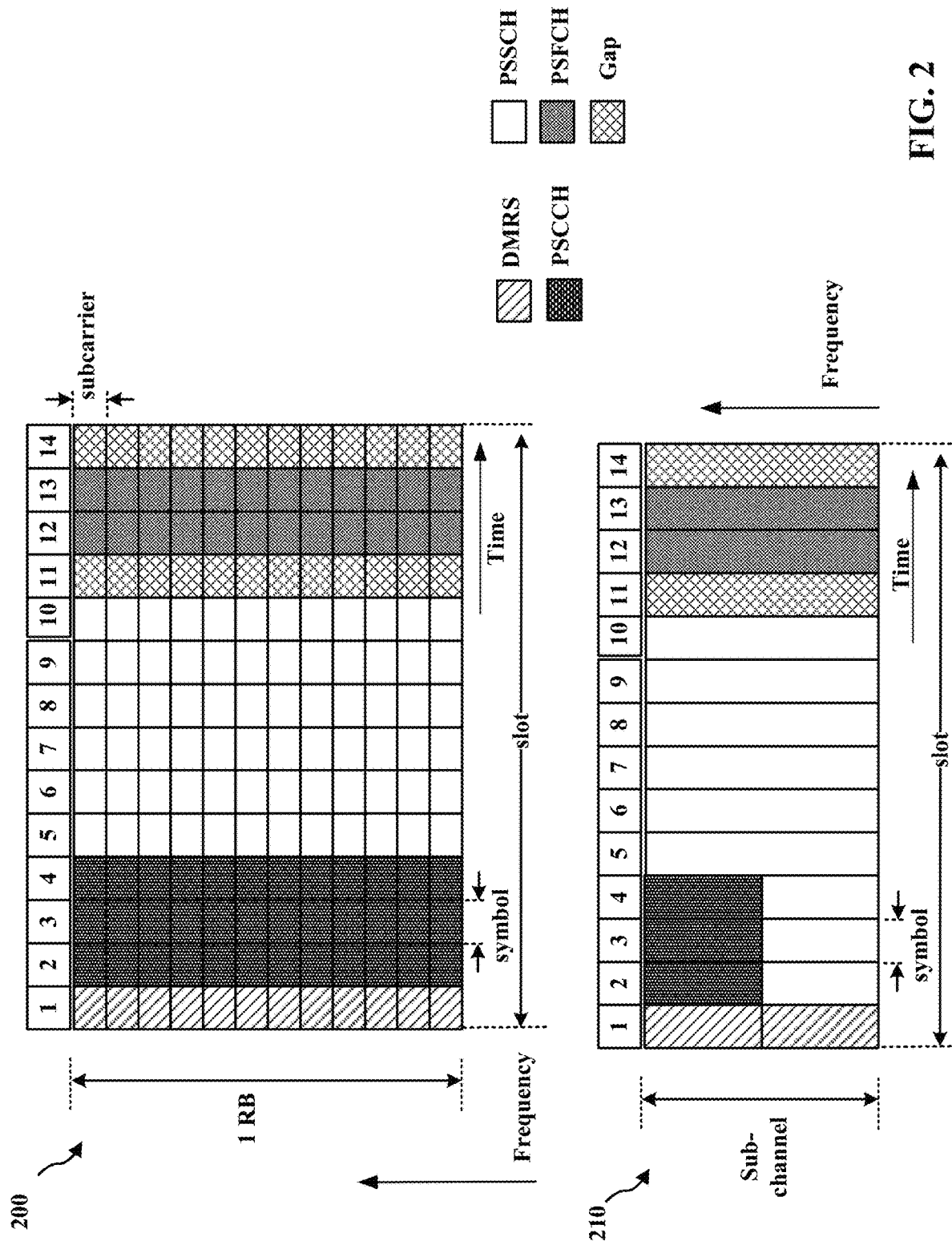
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
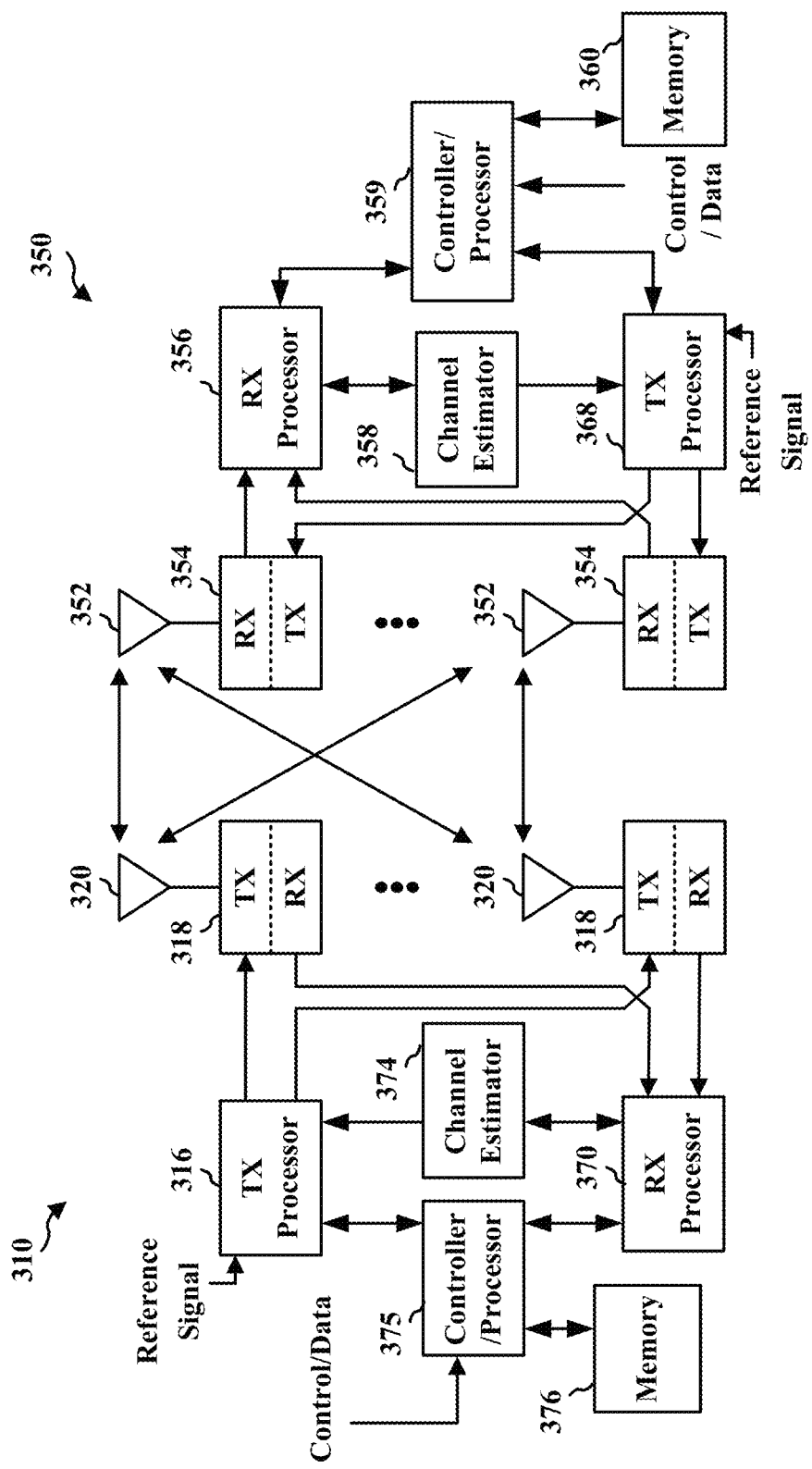
FIG. 3 is a diagram illustrating an example of a base station and user equipment (UE) in an access network.

FIG. 3 is a block diagram 300 of a first wireless communication device 310 in communication with a second wireless communication device 350. In some examples, the devices 310 and 350 may communicate based on V2X or other D2D communication. The communication may be based, e.g., on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In IIoT, sidelink connectivity such as D2D interfaces (e.g., PC5, otherwise referred as sidelink at the physical layer) may be used to connect various devices such as PLC and S/A. Sidelink usage may provide a number of potential advantages, such as high capacity, low latency, and/or battery savings. However, sidelink (SL) might not be solely relied on to offer high reliability (e.g., one in $10^{-6}$ of failure rate) for industrial traffic due to a variety of reasons. For example, the SL might not offer multipath diversity and may be vulnerable to blockages that can cause unacceptable outages (that may cause survival time constraint violation). In some aspects, setting up a back-up "two-hop" path that sends traffic to a base station and allows the base station to forward the traffic to the intended UE receiver may improve the reliability. The two-hop path may be highly reliable due to the use of multi-TRP configurations, the base station being mounted differently compared with a UE, or the like. But utilisation of multiple two-hop paths may lead to a lower network capacity, as the base station resources may be utilized by few PLC-S/A pairings compared to SL connectivity. In addition, the latency may be higher due to the packet traversing two hops.

Some aspects provided herein may combine the sidelink connectivity and the two-hop path for reliable transmission that may also be high capacity and low latency. For example, an initial transmission may occur on the sidelink and retransmission may be performed on the two hop-path. Additionally, in some aspects, low-latency high reliability traffic may benefit from duplication and transmission on the sidelink and the two-hop path. In some aspects, the PLC or S/As may be dynamically selecting the path according to sidelink channel sensing outcomes. In such aspects, the sidelink may be selected over the two-hop path for a UE (such as a PLC or S/A) that is not suffering from shadowing and UEs that suffer from shadowing may rely on the two-hop path for transmission.

Figure 4:
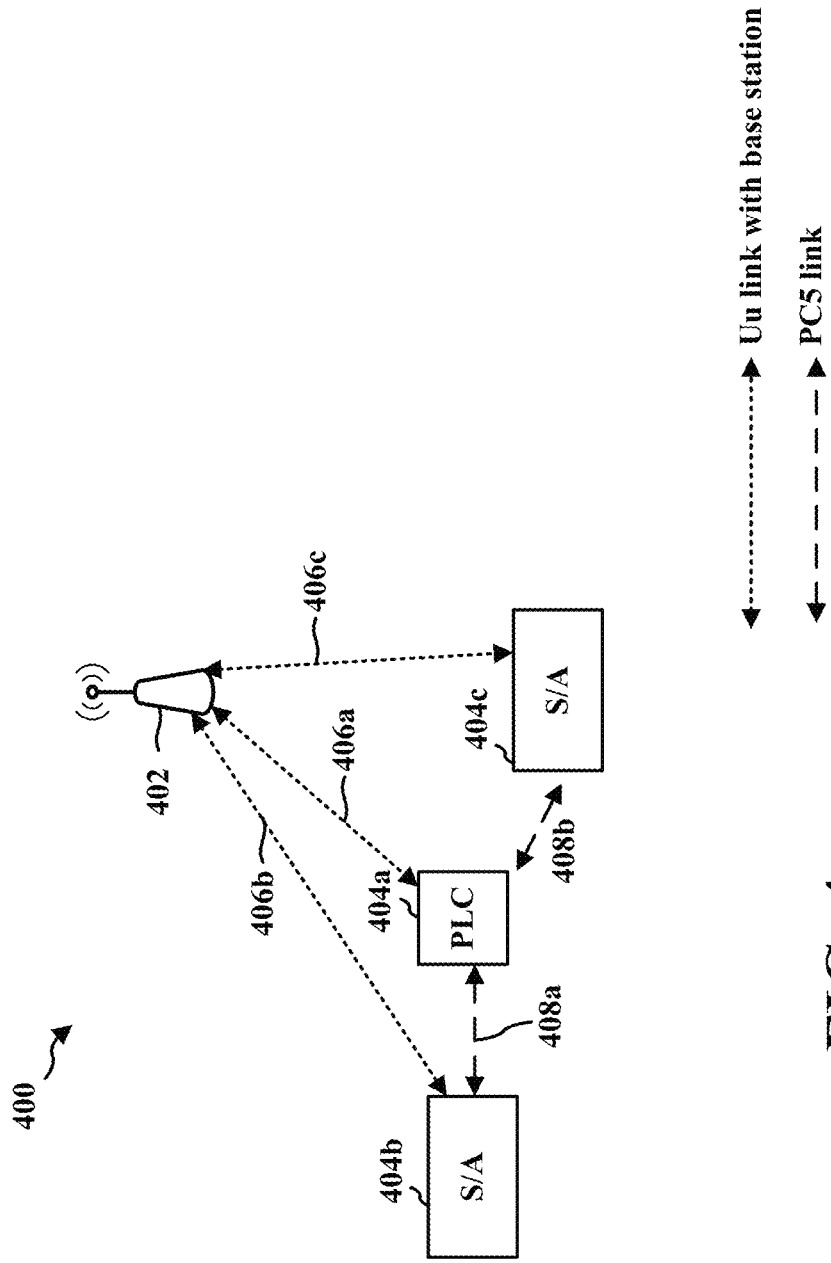
FIG. 4 is a diagram illustrating example sidelink communication.

FIG. 4 is a diagram 400 illustrating example sidelink communication which may include a base station 402 and UEs 404a, 404b, and 404c. The UE 404a may be a PLC and the UEs 404b and 404c may be S/As. In the illustrated example, the base station 402 may establish communication links 406a, 406b, and 406c with the UEs 404a, 404b, and 404c based on a Uu interface. The UEs 404a, 404b, and 404c may establish sidelink communication links 408a and 408b based on a sidelink interface (such as PC5).

The communication links 408a and 408b between any of the UEs 404a-404c may be degraded, fail, or be dropped. Accordingly, the communication links 406a, 406b, and 406c between the base station and the UEs 404a-404c may serve as a two-hop backup. For example, if the communication link 408a fails, the S/A 404b may communicate with the PLC 404a via communication with the base station 402. The base station may relay communication between the S/A 404b and the PLC 404a. Accordingly, the UFs may leverage the UEs' Uu connections with the base station as a two-hop path to another UE.

In a first sidelink resource allocation mode (which may be referred to herein as "Mode 1"), centralized resource allocation may be provided by a network entity. For example, a base station 102 or 180 as in FIG. 1, may determine resources for sidelink communication and may allocate resources to different UEs 104 to use for sidelink transmissions. In this first mode, a sidelink UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmissions. In order to coordinate the selection of sidelink resources by individual UEs, each UE may use a sensing technique to monitor for resource reservations by other sidelink UEs and may select resources for sidelink transmissions from unreserved resources.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that include s reservation information based on a resource reservation field comprised in the SCI. The UE may continuously monitor for (e.g., sense) and decode SCI from peer UEs. The SCI may include reservation information, e.g., indicating the slot and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation.

Figure 5:
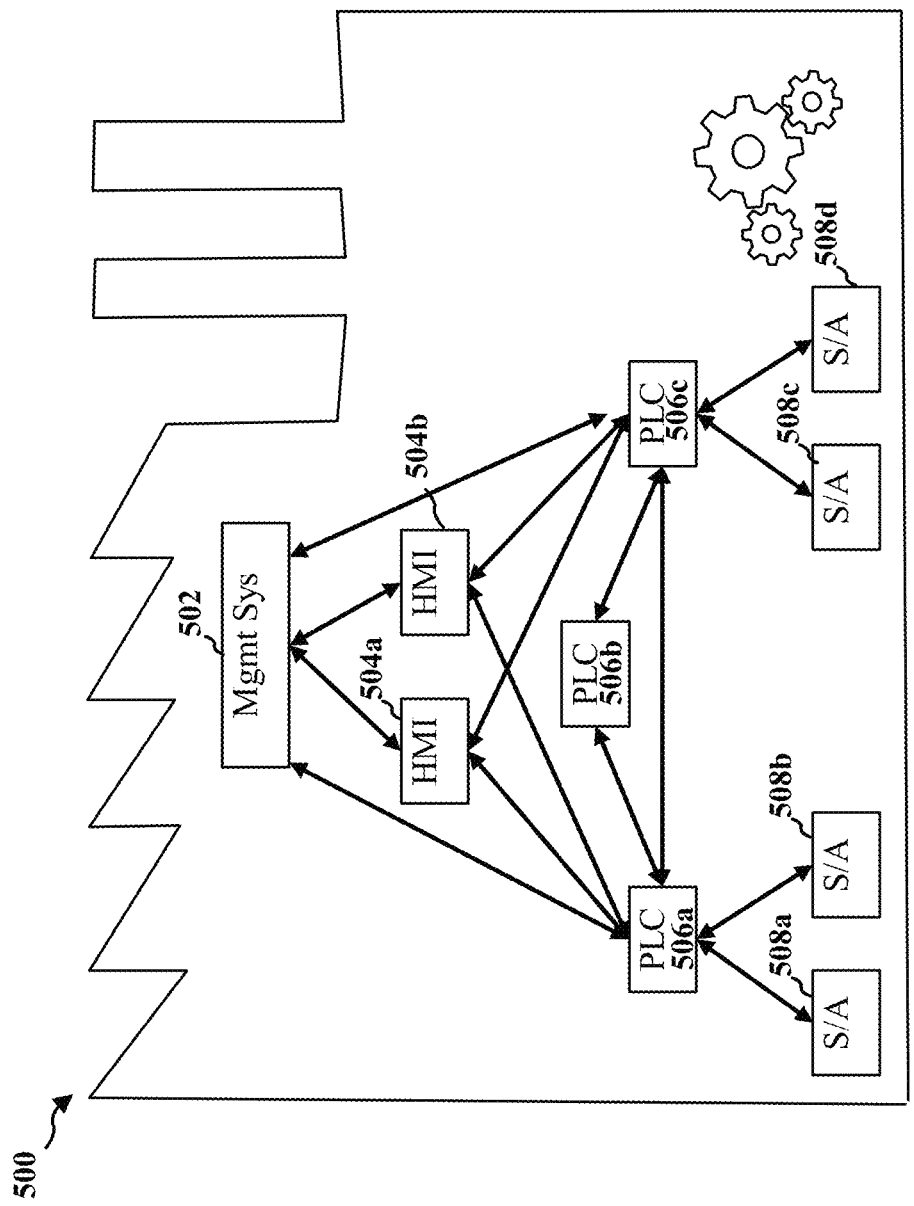
FIG. 5 is a diagram illustrating an example industrial system.

FIG. 5 is a diagram illustrating an example industrial system 500. As illustrated in FIG. 5, the example industrial system 500 may include a management system 502. The management system 502 may be connected with one or more HMIs 504a and 504b and one or more PLCs 506a, 506b, and 506c. The management system 502 may perform one or more of: controller programming of the PLCs, software and security management, and long term production monitoring. The HMIs 504a-504b may include one or more of a tablet, a panel, a wearable device, or the like. The HMIs 504a-504b may perform machine control at the floor, such as starting or stopping a machine and may provide monitoring via augmented reality or virtual reality. The PLCs, such as the PLC 506a and 506c, may each be connected with one or more S/As 508a, 508b, 508c, and 508d. The PLCs 506a-506c may be hardware configured to issue a series of commands (such as motion). The PLCs 506a-506c may be further configured to receive sensor inputs from the S/As 508a-508d. The S/As 508a-508d may include one or more of a rotary motor, a linear servo, a position sensor, or the like. The S/As 508a-508d may be reconfigurable and may support automation through robotic arms, automated guided vehicle (AGV), or the like.

Figure 6:
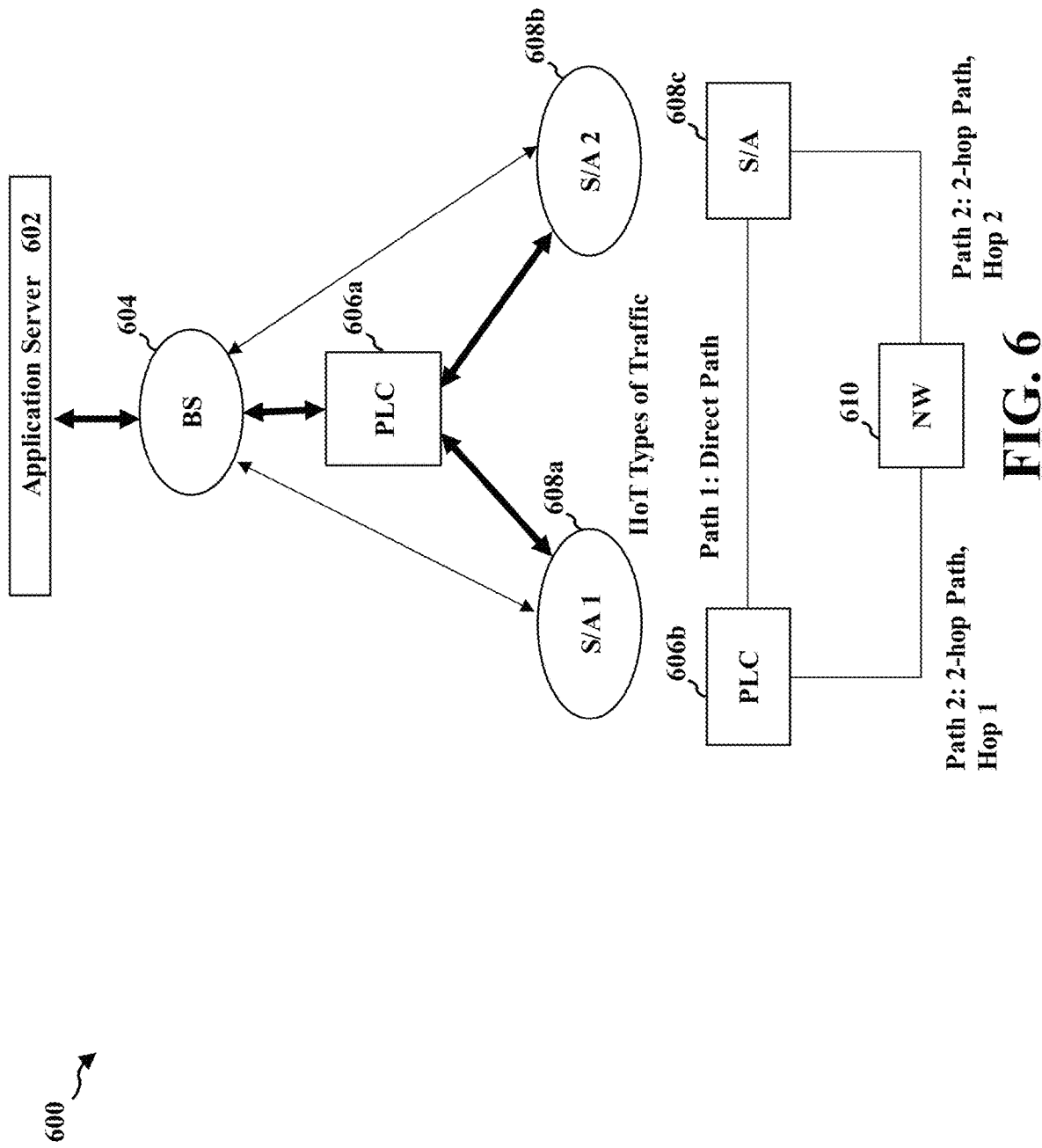
FIG. 6 is a diagram illustrating example traffic between programmable logic controller (PLC), base station, and sensor/actuator (S/A).

FIG. 6 is a diagram 600 illustrating traffic between PLCs, base station, and S/As. In some aspects, the traffic between a PLC 606a and one or more S/As 608a and 608b may include command and control, sensor measurements, or the like. In some aspects, the traffic between the PLC 606a and the base station (BS) 604 may include traffic to or from the application server 602 which may be associated with the management system. Some aspects provided herein may provide a dynamic and adaptive multi-path mode to achieve high capacity, low latency, high reliability PLC-S/A traffic. For example, the sidelink might not offer high reliability (e.g., a one in $10^{-6}$ failure rate) for industrial traffic. Example dynamic/adaptive multi-path modes provided herein may configure a first transmission from a PLC, such as the PLC 606b, to a S/A, such as the S/A 608c, to be on a direct path between the PLC 606b and the S/A 608c. The example dynamic/adaptive multi-path modes provided herein may configure a retransmission from the PLC 606b to the S/A 608c to be on a two-hop path via the network 610 (which may be a base station). The retransmission may be proactive or reactive, as further described in connection with FIGS. 11-15. The aggregation of transmission across paths may provide better redundancy handling, packet duplicate removal, and failure reporting. In addition, some aspects provided herein may enable a S/A or a PLC to react to sidelink blockage or shadowing and fast switching that may enable a switching time that is lower than a survival time.

Figure 7:
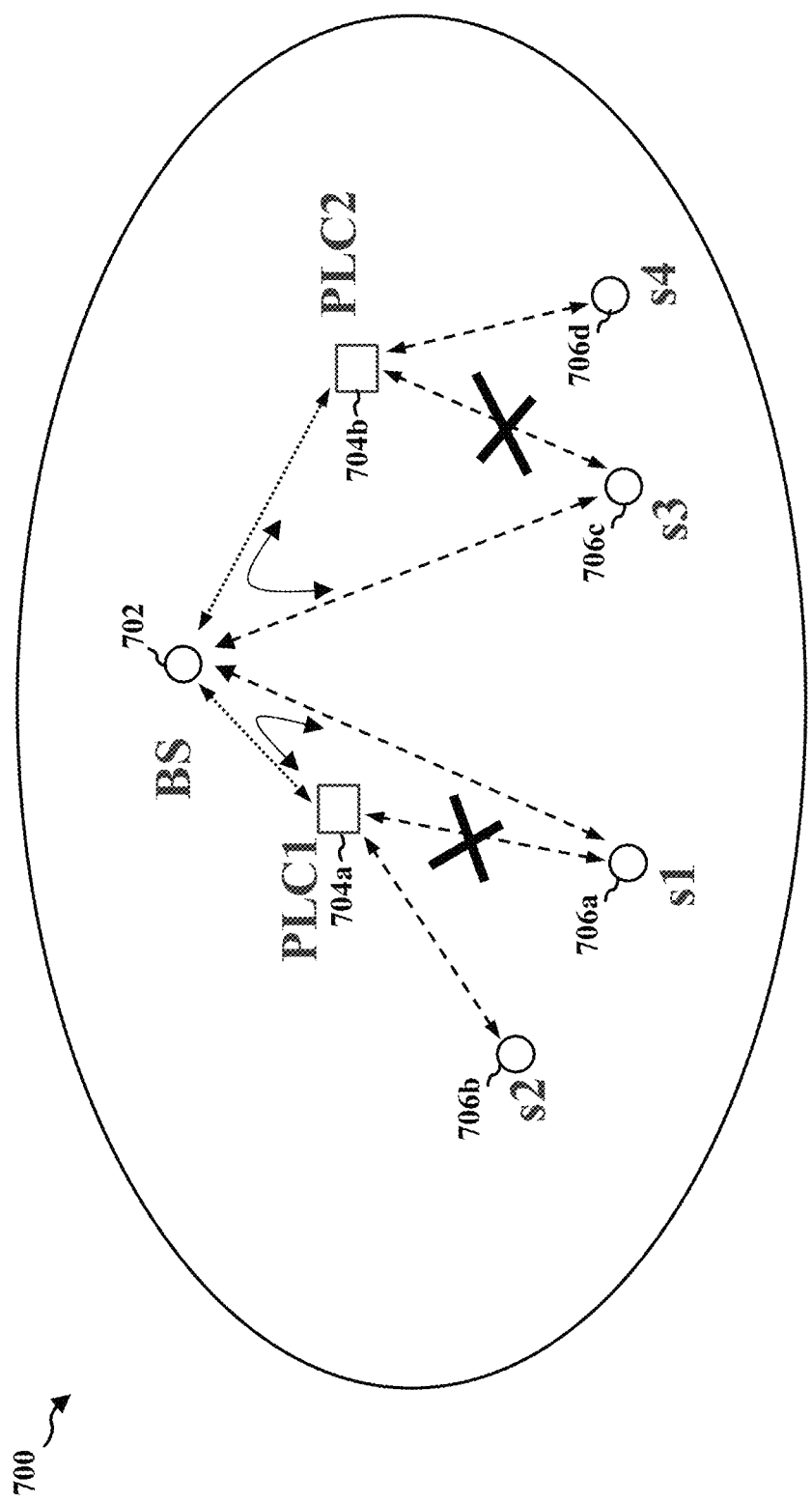
FIG. 7 is a diagram illustrating example hybrid sidelink and Uu communication.

FIG. 7 is a diagram 700 illustrating hybrid sidelink and Uu communication. As one example, a base station 702, PLCs 704a and 704b, and S/As 706a, 706b, 706c, and 706d are provided. An initial data transmission between the PLC 704a and the S/A 706a may be on a direct path via a sidelink interface between the PLC 704a and the S/A 706a. A retransmission between the PLC 704a and the S/A 706a may be based on a two-hop path by first transmitting to the base station 702, then the base station 702 may relay the transmission to the PLC 704a or the S/A 706a. In some aspects, a proactive base station fallback performed by a PLC or a S/A may include that the initial data transmission between the PLC (e.g., PLC 704a) and the S/A (e.g., S/A 706a) may be on reserved resources so that the base station may also decode the transmission. The base station (e.g., base station 702) may receive an acknowledgment (ACK) or a negative-acknowledgment (NACK) from a recipient, such as the S/A 706A. If a NACK is received, the base station 702 may transmit data in the data transmission between the PLC and the S/A to the S/A 706A. Under reactive base station fallback, in some aspects, after a transmission failure between the PLC 704a and the S/A 706a, the PLC 704a or the S/A 706a may perform the retransmission by transmitting to the base station 702 so that the base station 702 may relay the data to the PLC 704a or the S/A 706a.

Similarly, an initial data transmission between the PLC 704b and the S/A 706c may be on a sidelink interface between the PLC 704c and the S/A 706b. A retransmission between the PLC 704b and the S/A 706c may be based on first transmitting to the base station 702, then the base station 702 may relay the transmission to the PLC 704a or the S/A 706a. In some aspects, the retransmission may be performed because the initial transmission is blocked. Some aspects provided herein may provide the advantage of potentially high capacity, low latency, and/or battery savings because most communications between the PLCs and the S/As may be on a direct path via sidelink. The base station, which may be mounted on a ceiling and provide better coverage and may have an elevated transmission/reception point, may coordinate retransmissions to the PLCs or S/As to provide better reliability. Both mode 1 or mode 2 communications may be used for the sidelink communications.

In some aspects, under mode 1, the base station may configure sidelink configured grant (SL-CG) transmission/reception (Tx/Rx) at PLCs or S/As. The SL-CG may be configured without sidelink control information (SCI) to reduce overhead. In some aspects, the base station may also configure ACK/NACK resources for direct feedback on a first Tx from SL-Rx. In some aspects, the base station may also transmit retransmission (re-Tx) DCI to both SL-Tx and SL-Rx channel state information (CSI). For example, the base station may configure semi-periodic SL CSI-reference signal (RS), semi-periodic SL CSI reporting, and update SL-CG resource allocation based on updated CSI reports.

Under mode 2, in some aspects, the PLC configuration may be based on a rack system with different sub-systems such as power supply unit (PSU), central processing unit (CPU), interface module, communication processor, or the like.

Figure 8B:
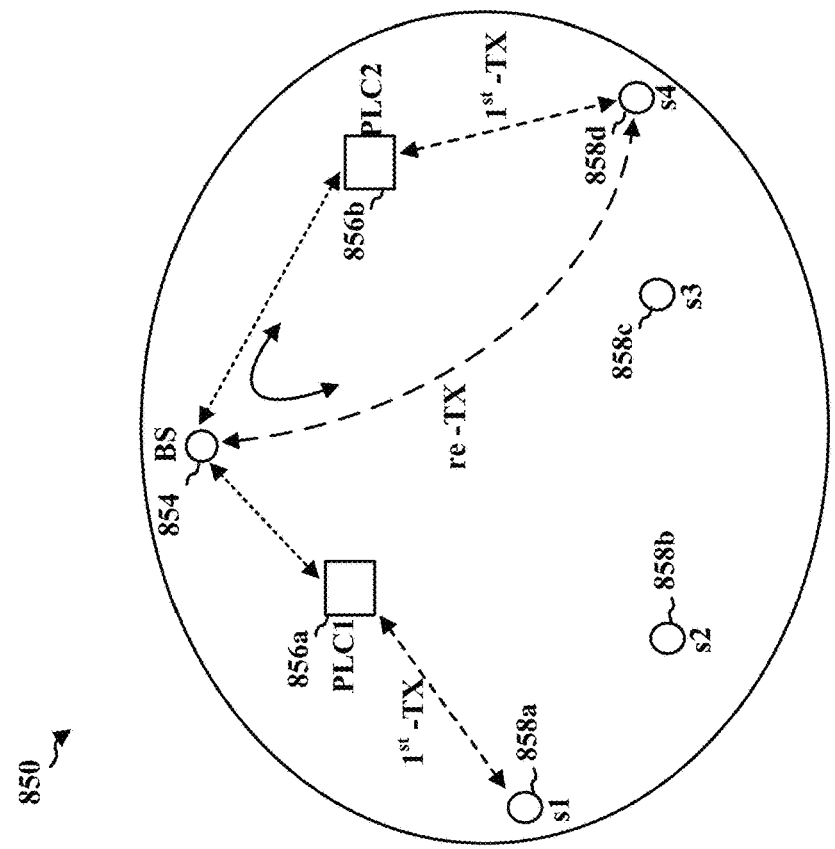
FIGS. 8A and 8B illustrate example hybrid static (hybrid-S) and hybrid dynamic (hybrid-D).
Figure 8A:
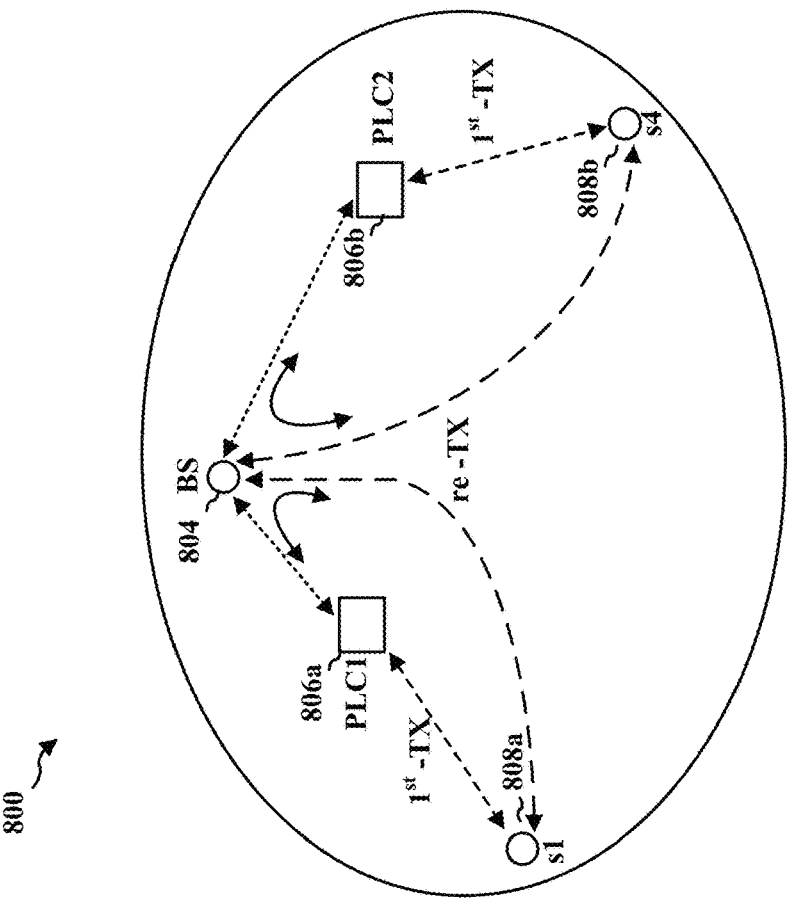

FIGS. 8A and 8B illustrate examples of hybrid static (hybrid-S) system 800 and hybrid dynamic (hybrid-D) system 850. In some aspects, the example hybrid-S system 800 may include a base station 804 and one or more PLCs 806a and 806*b* and one or more S/As 808*a* and 808*b*. Under hybrid-S, the configuration may be static. For example, one or more of the PLCs or S/As may be statically configured to perform initial transmission on sidelink and retransmission on a two-hop path using the base station 802 as a relay. In some aspects, the example hybrid-D system 850 may include a base station 854 and one or more PLCs 856*a* and 856*b* and one or more S/As 858*a*, 858*b*, 858*c*, and 858*d*. Under hybrid-D, the configuration may be dynamic. For example, one or more of the PLCs or S/As may be dynamically configured to dynamically perform initial transmission on sidelink or a two-hop path based on a channel condition (e.g., based on reference signal received power (RSRP) or the like) and perform retransmission on the two-hop path using the base station 854 as a relay.

Figure 9:
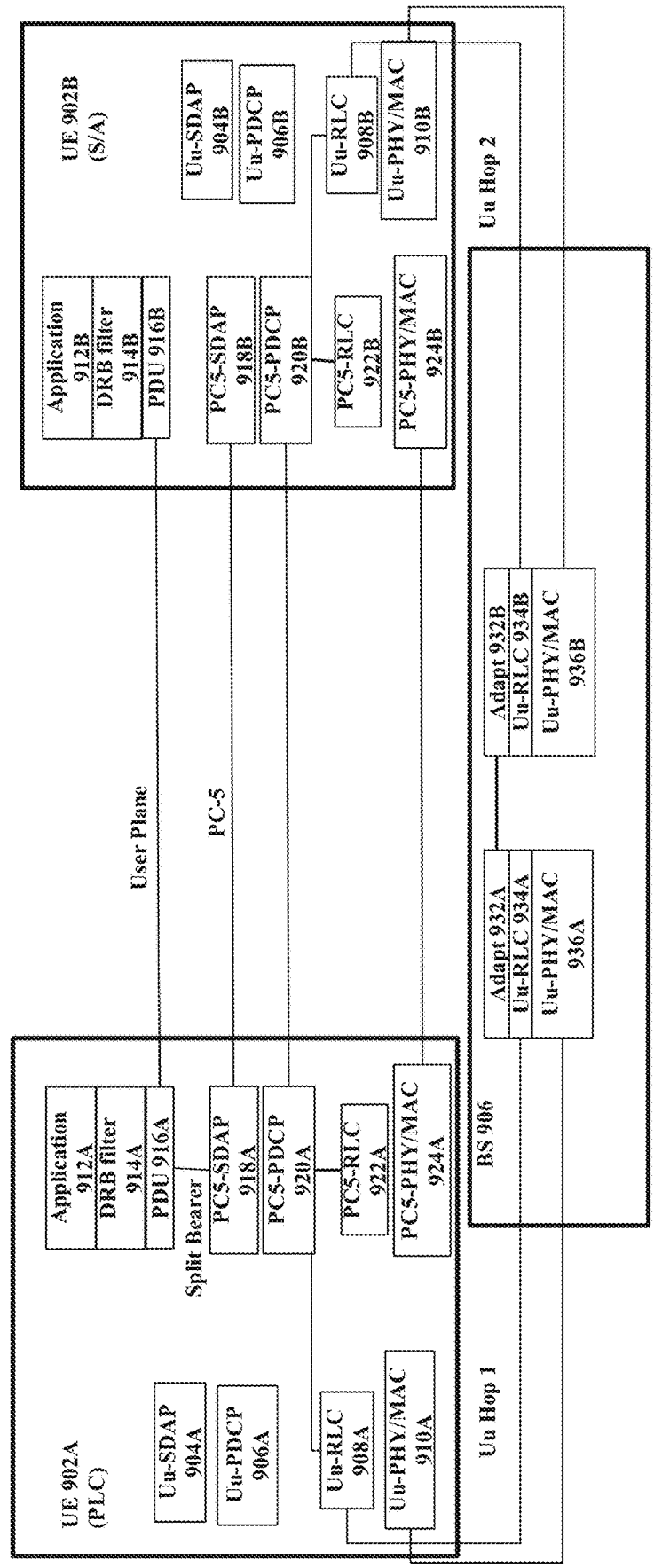
FIG. 9 illustrates example layers for packet data convergence protocol (PDCP) based path management and base station layer 2 (L2) relay.

FIG. 9 illustrates an example 900 of example layers for packet data convergence protocol (PDCP) based path management and base station layer 2 (L2) relay. As illustrated in FIG. 9, a UE 902A which may be a PLC and may include an application component 912A, a data radio bearer (DRB) component 914A, and a PDU component 916A. The UE 902A may further include a Uu service data adaptation protocol (SDAP) component 904A, a Uu PDCP component 906A, a Uu RLC component 908A, and a Uu physical layer (PHY) or medium access control (MAC) component 910A. The UE 902A may further include a PC5 SDAP component 918A, a PC5 PDCP component 920A, a PC5 RLC component 922A, and a PC5 PHY/MAC component 924A.

As illustrated in FIG. 9, a UE 902B which may be a S/A and may include an application component 912B, a DRB component 914B, and a PDU component 916B. The UE 902B may further include a Uu SDAP component 904B, a Uu PDCP component 906B, a Uu RLC component 908B, and a Uu PHY or MAC component 910B. The UE 902B may further include a PC5 SDAP component 918B, a PC5 PDCP component 920B, a PC5 RLC component 922B, and a PC5 PHY/MAC component 924B.

The PDU component 916A and the PDU component 916B may be connected with each other via a user plane. The PC5 SDAP component 918A and the PC5 SDAP component 918B may be connected with each other via sidelink. The PC5 PHY/MAC component 924A and PC5 PHY/MAC component 924B may also be connected with each other via sidelink.

The base station 906 may include adaptation component 932A and 932B that may be connected with each other. The base station 906 may further include a Uu-RLC component 934A and a Uu-RLC component 934B that may be respectively connected with the Uu RLC component 908A and the Uu RLC component 908B via a Uu link. The base station 906 may further include a Uu PHY/MAC component 936A and a Uu PHY/MAC component 936B that may be respectively connected with the Uu PHY or MAC component 910A and the Uu PHY or MAC component 910B.

In some aspects, PDCP duplication may be used to realize lower layer architectures supporting the previously described hybrid-D, hybrid-S, proactive base station fallback, and reactive base station fallback. For example, automatic repeat request (ARQ) may be used without using hybrid automatic repeat request (HARD). In some aspects, the PC5 PDCP may handle dual connectivity (DC) on PC5 and Uu RLC channels. In some aspects, RLC-MAC-PHY may be per link whereas SDAP-RRC-PDCP may be end-to-end (e2e).

In some aspects, the base station 906 may perform L2 relay independent of a user plane function (UPF). For example, the base station 906 may maintain sidelink PDCP e2e encryption and sequence numbering which may in turn enable Rx sidelink PDCP to decode PDUs and aggregate duplicates. In some aspects, PC5 RRC may handle signaling radio bearers (SRBs). In some aspects, channel measurements and Tx ACK/NACK feedback may be forwarded from RLC components to PC-5 PDCP components 920A and 920B to enable dynamic Tx mode selection to enable hybrid-D.

Figure 10:
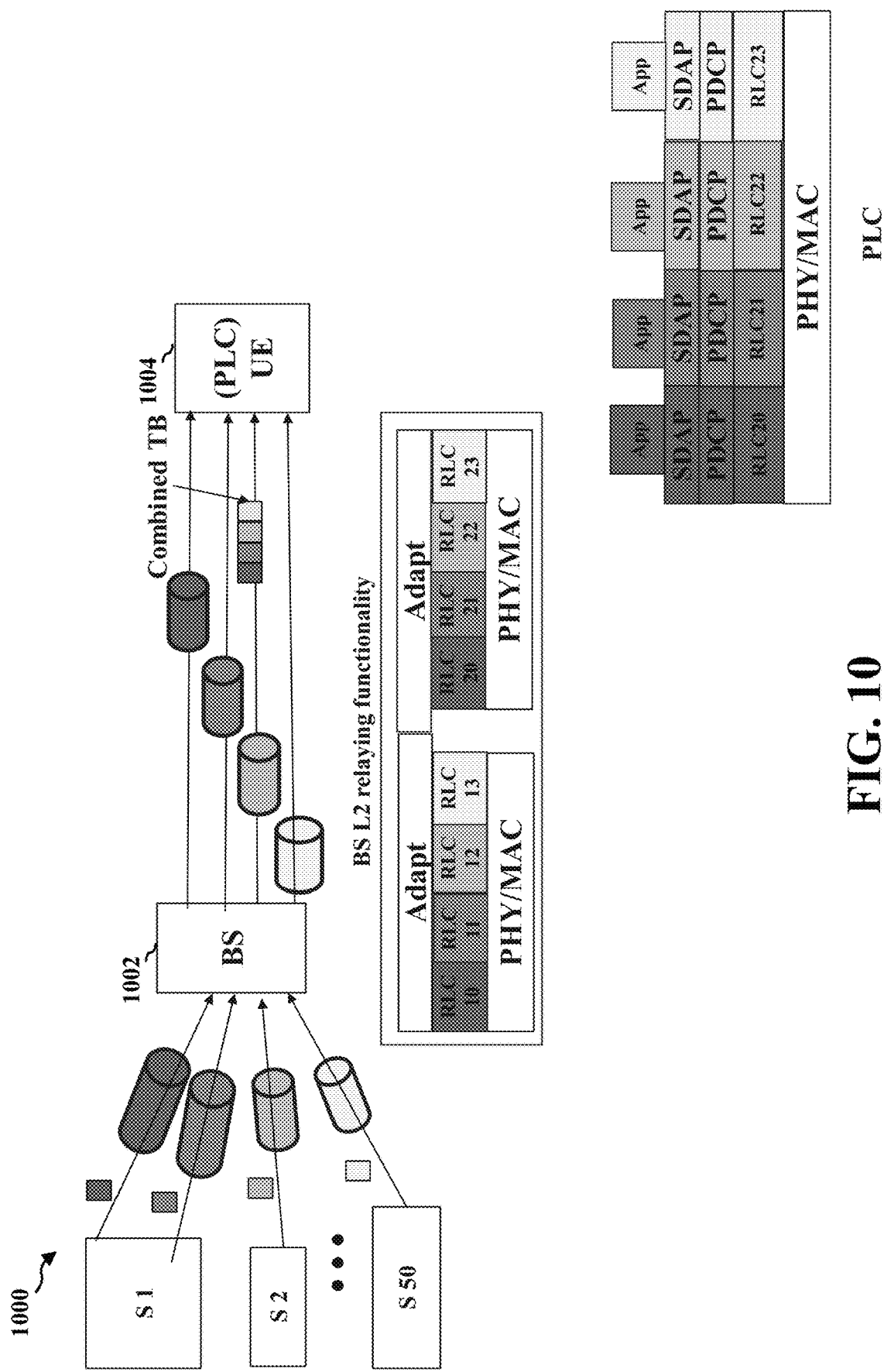
FIG. 10 illustrates example base station adaptation layer.

FIG. 10 is a diagram 1000 illustrating example base station adaptation layer. As illustrated in FIG. 10, the base station 1002 may act as an L2 relay between two UEs such as one of S/As from S1 to S50 and the PLC 1004. The base station 1002 may perform one-to-one RLC channel mapping between UL and DL. All the relayed traffic may be carried on one or more radio bearers and the adaptation layer may use an RLC identifier (ID) to forward traffic between UEs on the base station relay path. For example, Tx RLC channels 10, 11, 12, and 13 for S1 to UE 1004, S2 to 1004, and S50 to 1004 may be one-to-one mapped to Rx RLC channels 20, 21, 22, and 23.

Figure 11:
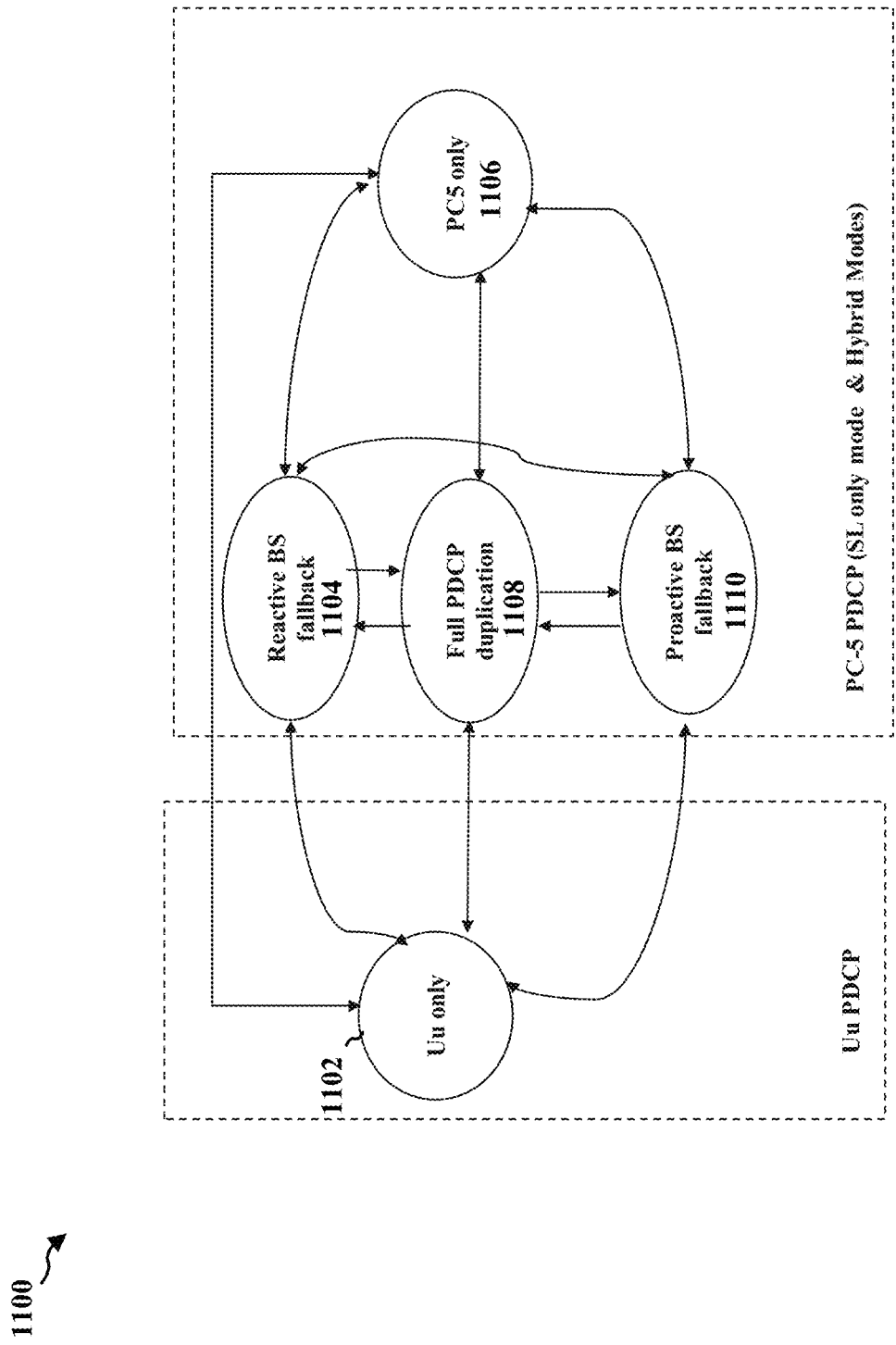
FIG. 11 illustrates example per-bearer control plane state machine.

FIG. 11 illustrates example per-bearer control plane state machine 1100. In some aspects, switching from Uu to sidelink may enable the choice of the appropriate mode of duplication such as full PDCP duplication 1108 or another type of duplication. A UE may switch between Uu communication without sidelink communication 1102, reactive base station fallback 1104, full PDCP duplication (across Uu and sidelink) 1108, proactive base station fallback 1110, or sidelink communication without Uu communication 1106. For example, the UE may switch based on a quality of service (QoS). The QoS may be determined by a QoS provisioning block at the UE1/UE2 or the network (e.g., depending on initiator of the connection). The QoS may be across two paths (sidelink and two-hop Uu) and may provision reliability (e.g., overall one in $10^{-6}$ fail rate=sidelink one in $10^{-2}$ fail rate×Uu one in $10^{-4}$ fail rate) and packet delay budget (e.g., 5 ms=2 ms (initial PC5 Tx)+3 ms (Uu re Tx) if reactive retransmission is used).

Figure 12:
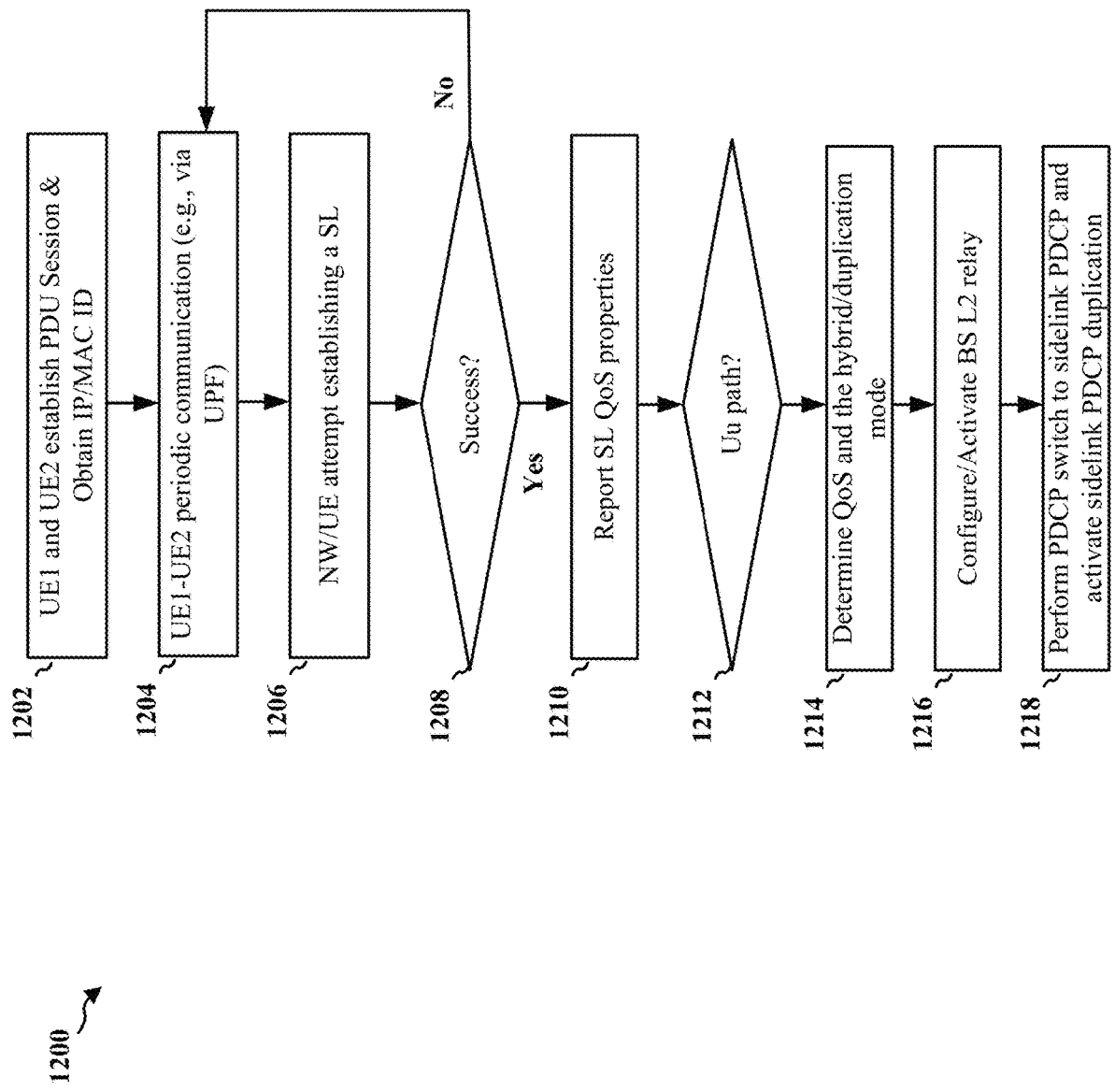
FIG. 12 is a flowchart illustrating example control plane operations.

FIG. 12 is a flowchart 1200 illustrating control plane operations for the UEs and the base station. At 1202, a first UE (UE1) and a second UE (UE2) may establish PDU session and obtain an Internet Protocol (IP)/MAC ID. At 1204, UE1 and UE2 may periodically communicate, such as communication via UPF. At 1206, the network (NW) and UE1 and UE2 may establish sidelink communications. If the sidelink communication is not successfully set up at 1208, the UE1 and UE2 may return to 1204 and periodically communicate. If the sidelink communication is successfully set up at 1208, the UE1 and the UE2 may report sidelink QoS properties at 1210. The network or UE1/UE2 may determine whether a two-hop path utilising a Uu connection may be used based on the QoS at 1212. For example, if the QoS is poor for the sidelink communication, the Uu connection may be used. At 1214, the network or the UE1/UE2 may determine the QoS and a hybrid/communication mode. At 1216, the network may configure or activate a base station L2 relay. At 1218, a PDCP switch to a sidelink PDCP may be performed by UE1 and UE2 and sidelink PDCP duplication may be activated.

Figure 13C:
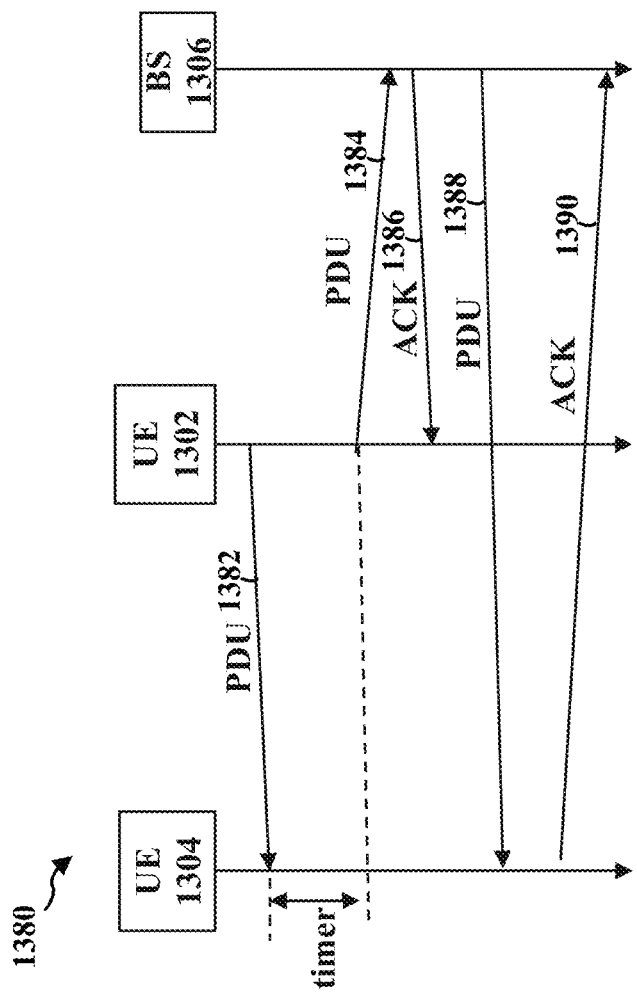

FIGS. 13A-13C illustrate examples of hybrid mode switching. As illustrated in example of proactive base station fallback 1300 of FIG. 13A, a first UE 1302 may transmit a PDU 1312*a* and a PDU 1312*b* to a second UE 1304 and a base station 1306. The packets in the PDU 1312*b* may be held by the base station 1306 in an adaptation layer buffer. The UE 1304 may transmit NACK 1314A to the UE 1302 and the base station may transmit ACK 1314*b* to the UE

1302. The UE 1304 may transmit a request of lost PDU 1316 to the base station 1306 based on a timer expiry or a HARQ overhear (such as overhearing ACK 1314b). Upon receiving the request of lost PDU 1316, the base station 1306 may transmit data in the PDU 1312b (that may be stored in the adaptation layer buffer) in PDU 1318 to the UE 1304. Upon receiving the PDU 1318, the UE 1304 may transmit an ACK 1320 to the base station 1306.

In another example related to full duplication, the UE 1302 may transmit a PDU 1332a and a PDU 1332b to the UE 1304 and the base station 1306. The UE 1304 may transmit NACK 1324A to the UE 1302 and the base station may transmit ACK 1324b to the UE 1302. The NACK transmitted by the UE 1304 may trigger full duplication and the base station 1306 may transmit data in the PDU 1322b (that may be stored in the adaptation layer buffer) in PDU 1326a to the UE 1304. In addition, the UE 1302 may also transmit PDU 1326b that may include data in the PDU 1322a. After receiving the PDU 1326a and the PDU 1326b, the UE 1304 may transmit ACK 1328a and ACK 1328b to the UE 1302 and the base station 1306.

As illustrated in the example of reactive base station fallback 1330 of FIG. 13B, the UE 1304 may transmit CSI-RS 1332 indicating a sidelink channel condition and may include sidelink RSRP to the UE 1302. The UE 1302 may transmit a PDU 1334 to the UE 1304 based on the CSI-RS (e.g., based on a good sidelink channel condition that may be determined based on high sidelink RSRP in the CSI-RS 1332). If the UE 1304 failed to receive the PDU 1334, the UE 1304 may transmit NACK 1336 to the UE 1302. Based on the NACK, the UE 1302 may transmit PDU 1338 to the base station 1306 to perform two-hop transmission to the UE 1304 and the base station may relay the data in PDU 1336. After receiving the PDU 1338, the base station 1306 may transmit ACK 1340 to the UE 1304 and may relay the data in the PDU 1338 in PDU 1342 to the UE 1304. After receiving the PDU 1342, the UE 1304 may transmit an ACK 1344 to the base station 1306.

In another example, the UE 1304 may transmit CSI-RS 1346 to the UE 1302. Based on the CSI-RS 1346 (e.g., based on a bad sidelink RLC channel condition that may be determined based on low sidelink RSRP in the CSI-RS 1346), the UE 1302 may determine to use two-hop transmission and transmit PDU 1348 to the base station 1306, so that the base station 1306 may relay the data in the PDU 1348 to the UE 1304. After receiving the PDU 1348, the base station 1306 may transmit ACK 1350 to the UE 1304 and may relay the data in the PDU 1348 in PDU 1352 to the UE 1304. After receiving the PDU 1352, the UE 1304 may transmit an ACK 1354 to the base station 1306.

In some aspects, multi-bit HARQ feedback may aid the scheduler in switching to the correct mode. In some aspects, Hybrid-D modes may also be implemented by making each Tx decision based on channel measurements e.g., (L1-RSRP). In some aspects, a PLC may consolidate measurements and choose S/As with the stronger SL connection (e.g., based on RSRP) to perform sidelink Tx while utilising Uu resources for S/As with weaker SL.

As illustrated in example 1380 of FIG. 13C, the UE 1302 may transmit a PDU 1382. After a timer expires and an ACK is still not received by the UE 1302 or upon receiving an NACK, the UE 1302 may transmit PDU 1384 to the base station 1306. The base station may transmit an ACK 1386 to the UE 1302 and relay data in the PDU 1384 in a PDU 1388 to the UE 1304. After receiving the PDU 1384, the UE 1304 may transmit an ACK 1390 to the base station 1306.

Figure 14:
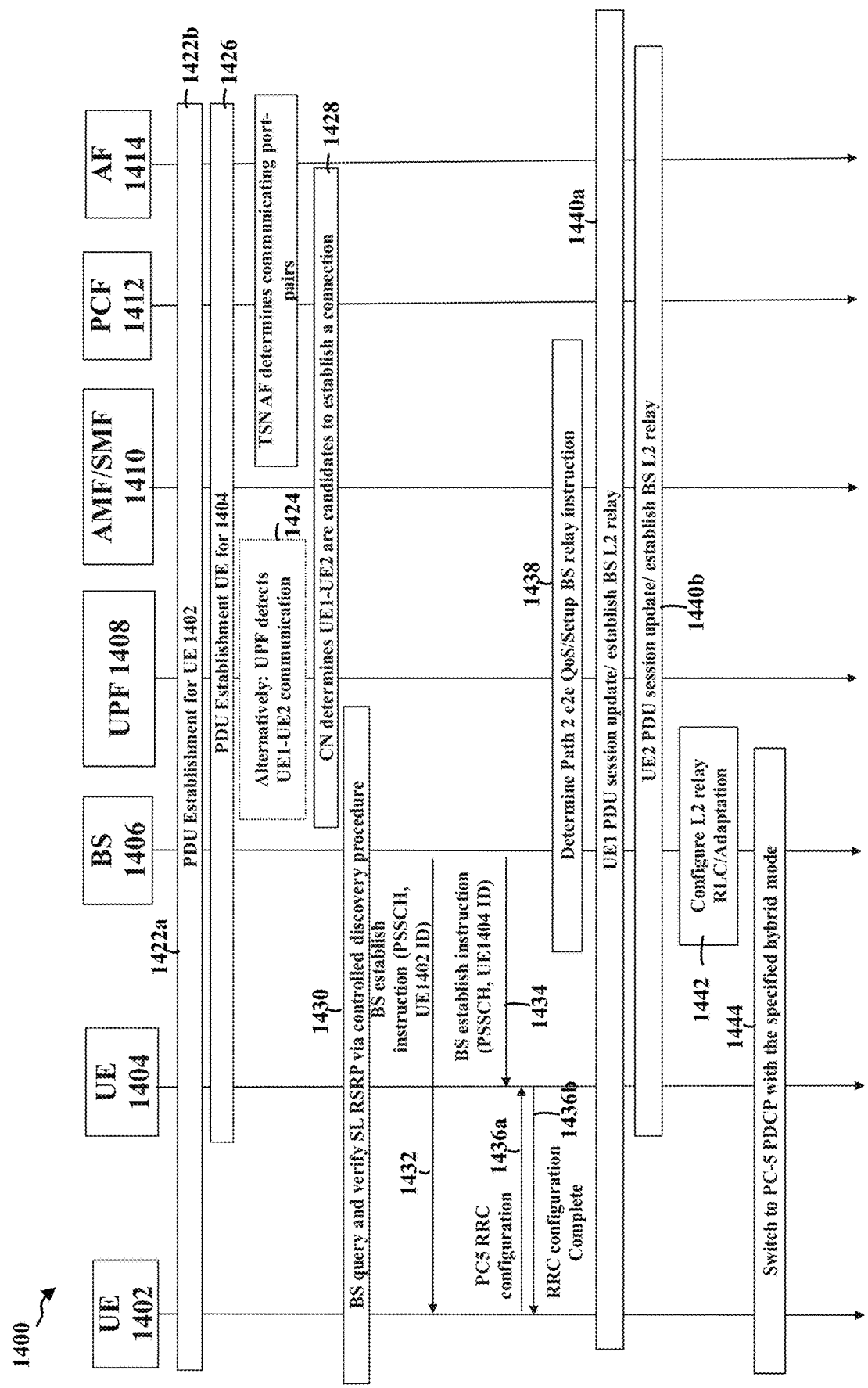
FIG. 14 is a diagram illustrating an example communication flow for switching to sidelink communication.

FIG. 14 is a diagram 1400 illustrating communication flow for switching to sidelink communication (that may be initiated by a network). As illustrated in FIG. 14, a first UE 1402, a second UE 1404, a base station 1406, and one or more components of a core network such as UPF 1408, an AMF/SMF 1410, a policy control function (PCF) 1412 (that may be responsible for supporting QoS), and an application function (AF) 1414 (that may be responsible for applications traffic routing) may be provided. At 1422a, the UE 1402 may establish a PDU session with the base station 1406 and the one or more components of the core network such as the UPF 1408, the AMF/SMF 1410, the PCF 1412, and the AF 1414. At 1422b, the UE 1404 may establish a PDU session with the base station 1406 and the one or more components of the core network such as the UPF 1408, the AMF/SMF 1410, the PCF 1412, and the AF 1414. In some aspects, at 1426, the AF 1414 (that may be a time sensitive networking (TSN) AF) may determine communicating port pairs. In some aspects, at 1428, the one or more components of the core network such as the UPF 1408, the AMF/SMF 1410, the PCF 1412, and the AF 1414 may determine UE 1402 and UE 1404 as candidates for establishing a connection. In some alternative aspects, at 1424, the UPF 1408 may detect a sidelink communication between UE 1402 and UE 1404.

At 1430, the base station 1406 may query and verify sidelink RSRP between the UFs 1402 and 1404 via controlled discovery procedure. In some aspects, at 1432, the base station 1406 may establish instruction by transmitting PSSCH and an ID associated with the UE 1402 to the UE 1402. At 1434, the base station 1406 may establish instruction by transmitting PSSCH and an ID associated with the UE 1404 to the UE 1404. The UE 1404 may transmit a sidelink RRC configuration 1436a to the UE 1402 and receive a RRC configuration complete 1436b from the UE 1402. At 1438, the base station may determine path 2 e2e QoS or set up base station relay instruction with the core network (such as the UPF 1408 and the AMF/SMF 1410. At 1440a, the UE 1402 may update the PDU session with the base station 1406 and one or more components of the core network such as the UPF 1408, the AMF/SMF 1410, the PCF 1412, and the AF 1414 to establish a base station L2 relay. At 1440b, the UE 1404 may update the PDU session to establish a base station L2 relay. At 1442, the base station 1406 may configure L2 relay RLC and adaptation layer. At 1444, the UE 1402, the UE 1404, and the base station 1406 may switch to sidelink PDCP with a hybrid mode previously described.

Figure 15:
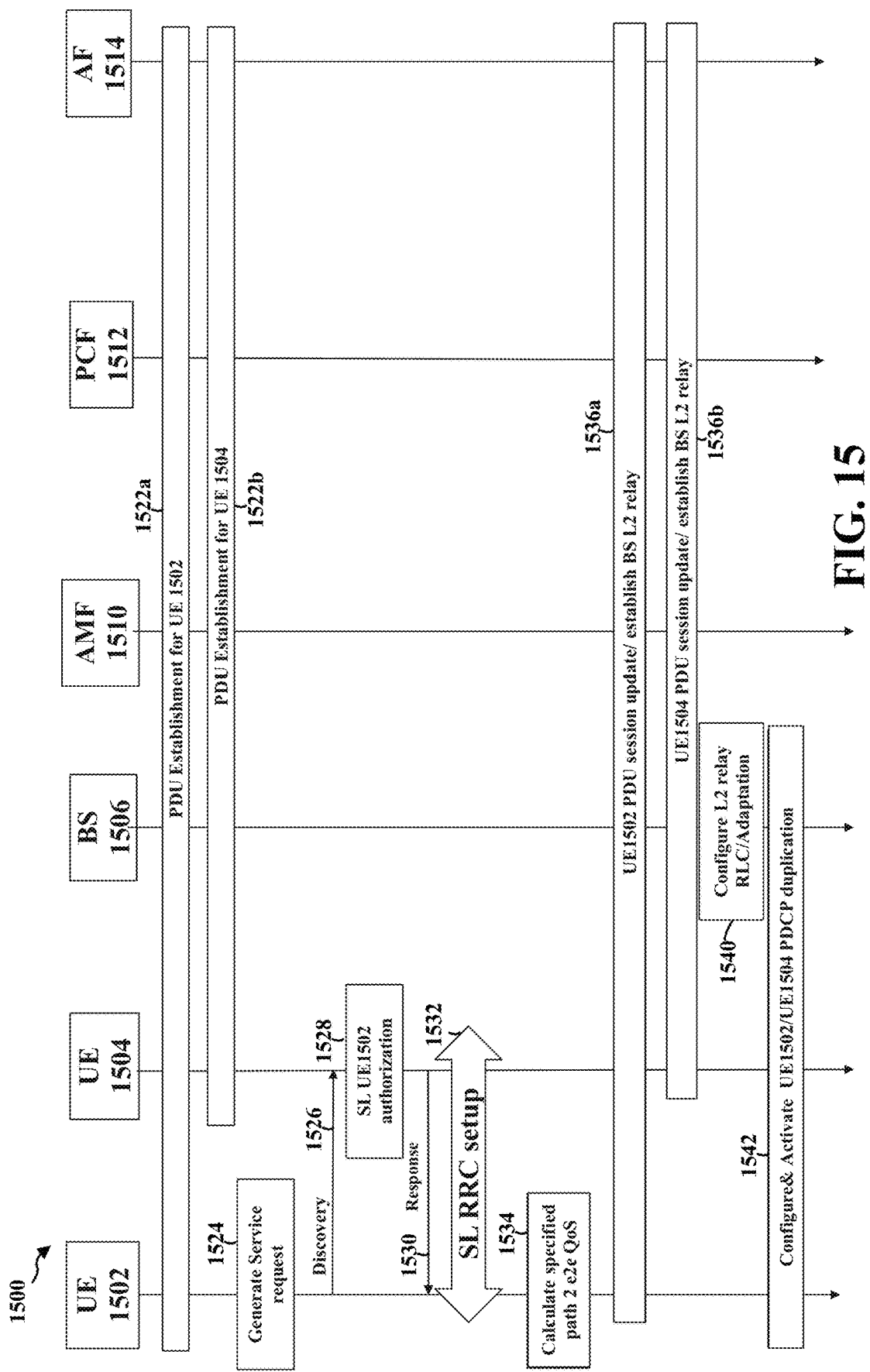
FIG. 15 is a diagram illustrating an example communication flow for switching to sidelink communication.

FIG. 15 is a diagram 1500 illustrating communication flow for switching to sidelink communication (that may be initiated by a UE). As illustrated in FIG. 15, a first UE 1502, a second UE 1504, a base station 1506, and one or more components of a core network such as UPF 1508, an AMF/SMF 1410, a PCF 1512 (that may be responsible for supporting QoS), and an AF 1514 (that may be responsible for applications traffic routing), may be provided. At 1522a, the UE 1502 may establish a PDU session with the base station 1506 and the one or more components of the core network such as the UPF 1508, the AMF/SMF 1510, the PCF 1512, and the AF 1514. At 1522b, the UE 1504 may establish a PDU session with the base station 1506 and the one or more components of the core network such as the UPF 1508, the AMF/SMF 1510, the PCF 1512, and the AF 1514. The UE 1502 may generate a service request at 1524 and transmit a discovery message 1526 to discover the UE 1504. At 1528, the UE 1504 may perform sidelink authorization for the UE 1502 and transmit a response 1530 to the UE 1502, granting a sidelink connection request. At 1532, the UE 1502 and the UE 1504 may perform a sidelink RRC setup. At 1534, the UE 1502 may calculate a specified path 2 e2e QoS for the sidelink connection. At 1536a, the UE 1502 may update the PDU session with the base station 1506 and one or more components of the core network such as the UPF 1508, the AMF/SMF 1510, the PCF 1512, and the AF 1514 to establish a base station L2 relay. At 1536b, the UE 1504 may update the PDU session with the base station 1506 and one or more components of the core network such as the UPF 1508, the AMF/SMF 1510, the PCF 1512, and the AF 1514 to establish a base station L2 relay. At 1540, the UE 1504 may update the PDU session to establish a base station L2 relay. At 1540, the base station 1506 may configure the L2 relay RLC and adaptation layer. At 1542, the UE 1502, the UE 1504, and the base station 1506 may configure and activate PDCP duplication for UEs 1502 and 1504.

Figure 16:
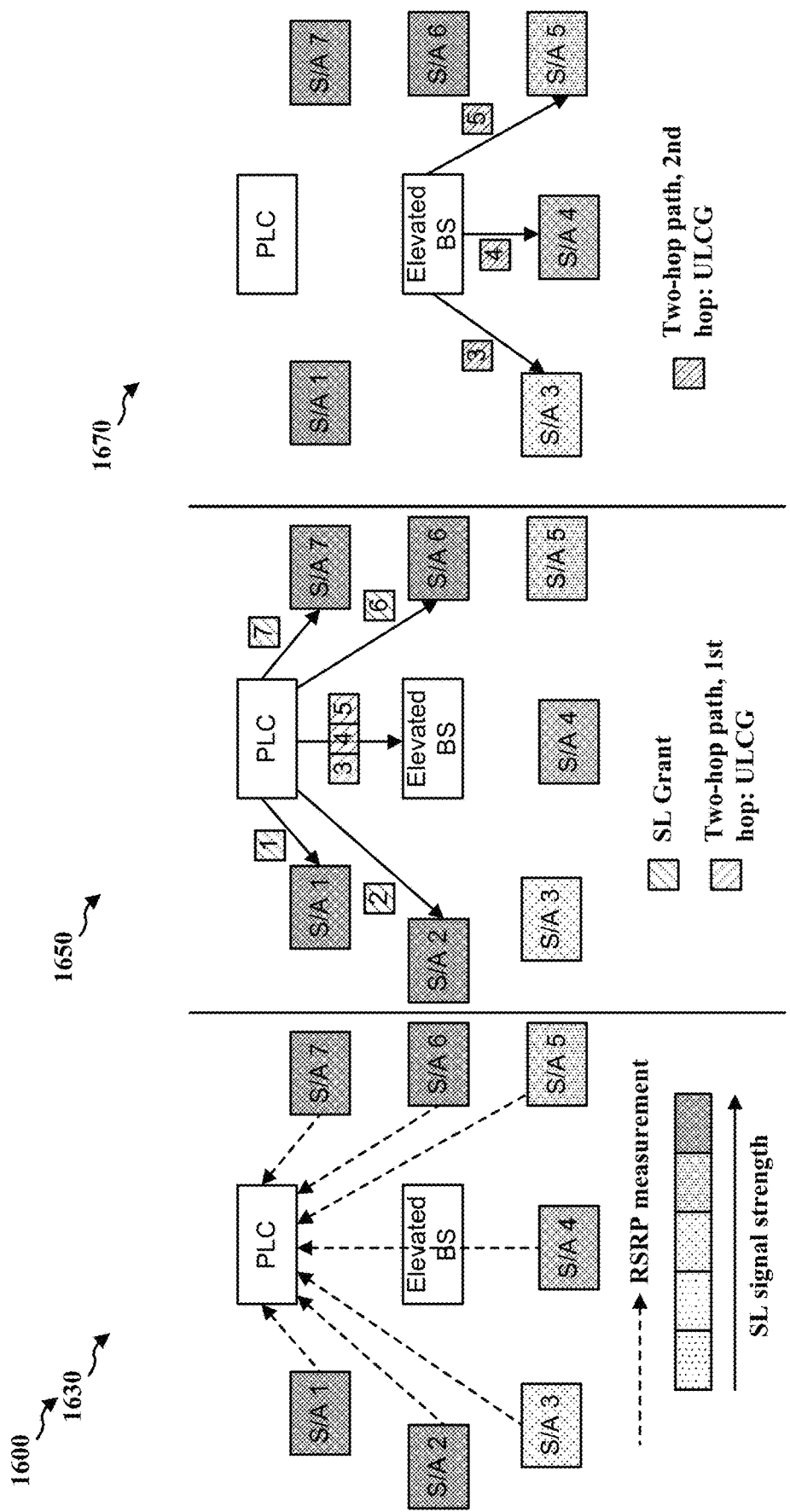
FIG. 16 is a diagram illustrating example dynamic path selection.

FIG. 16 is a diagram 1600 illustrating examples of dynamic path selection. As illustrated in example 1630, the S/As 1-7 connected to a same PLC may each report a RSRP measurement based on a different SL signal strength to the PLC. Based on the reported RSRP measurements, as illustrated in example 1650, the PLC may configure a sidelink grant to the S/As with a stronger SL signal strength and trigger two-hop communication based on an UL CG via an elevated base station for the S/As with a weaker signal strength. As illustrated in example 1670, the base station may relay data packets received from the PLC to the S/As with a weaker SL signal strength.

In some aspects, multiple base stations may be used. For example, a first UE (UE1) and a second UE (UE2) may be connected to a same centralized unit (CU) and different distributed units (DUs). In another example, UE1 and UE2 may be connected to different CUs and DUs. The different CUs and DUs may forward the data to be relayed according to various aspects of the present disclosure.

Figure 17:
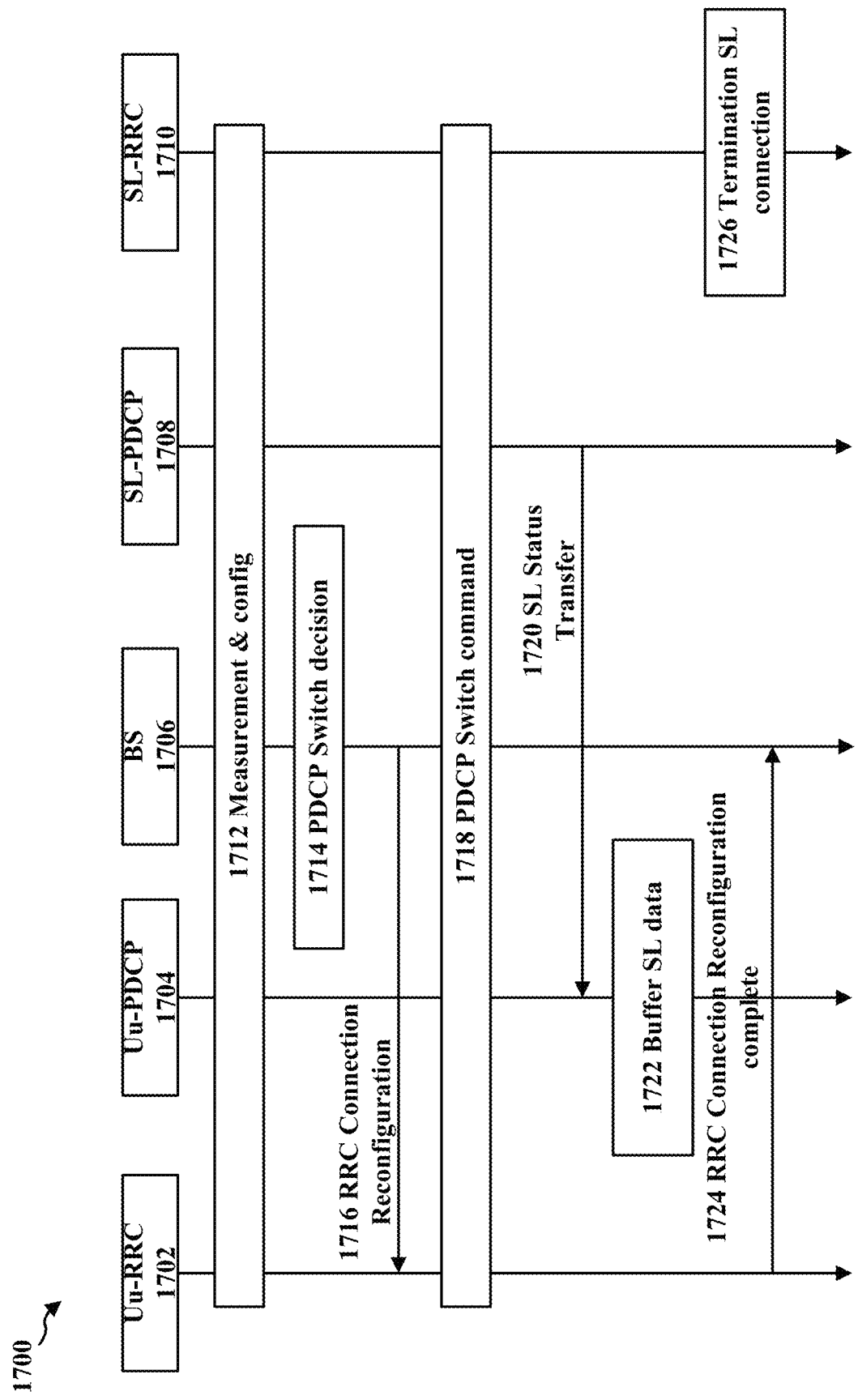
FIG. 17 is a diagram illustrating an example communication flow for PDCP switching.

In some aspects, PDCP signaling may be used to terminate sidelink and switch to a Uu PDCP mode. For example, when sidelink suffers long term shadowing (over a period of time) or in a mixed SL-UU architecture, such PDCP switching may be triggered. FIG. 17 is a diagram 1700 illustrating example communication flow for PDCP switching. A Uu-RRC component 1702, a Uu-PDCP component 1704, a base station 1706, a sidelink PDCP component 1708, and a sidelink-RRC component 1710 may be provided. At 1712, measurements (such as RSRP measurements) and configurations may be shared between the Uu-RRC component 1702, the Uu-PDCP component 1704, the base station 1706, the sidelink PDCP component 1708, and the sidelink-RRC component 1710. At 1714, the base station 1706 may determine to perform PDCP switch based on the measurements and transmit a RRC connection reconfiguration 1716 to the Uu-RRC component 1702. Accordingly, at 1718, PDCP switch command may be transmitted between the Uu-RRC component 1702, the Uu-PDCP component 1704, the base station 1706, the sidelink PDCP component 1708, and the sidelink-RRC component 1710. At 1720, the SL-PDCP component 1708 may transmit SL status buffer 1720 to the Uu-PDCP component 1702 and the Uu-PDCP may buffer the SL data at 1722. At 1724, after the SL data is buffered, the Uu-RRC component 1702 may transmit a RRC connection reconfiguration complete 1724 to the base station 1706. The SL-RRC component 1710 may accordingly terminate the SL connection at 1726.

Figure 18:
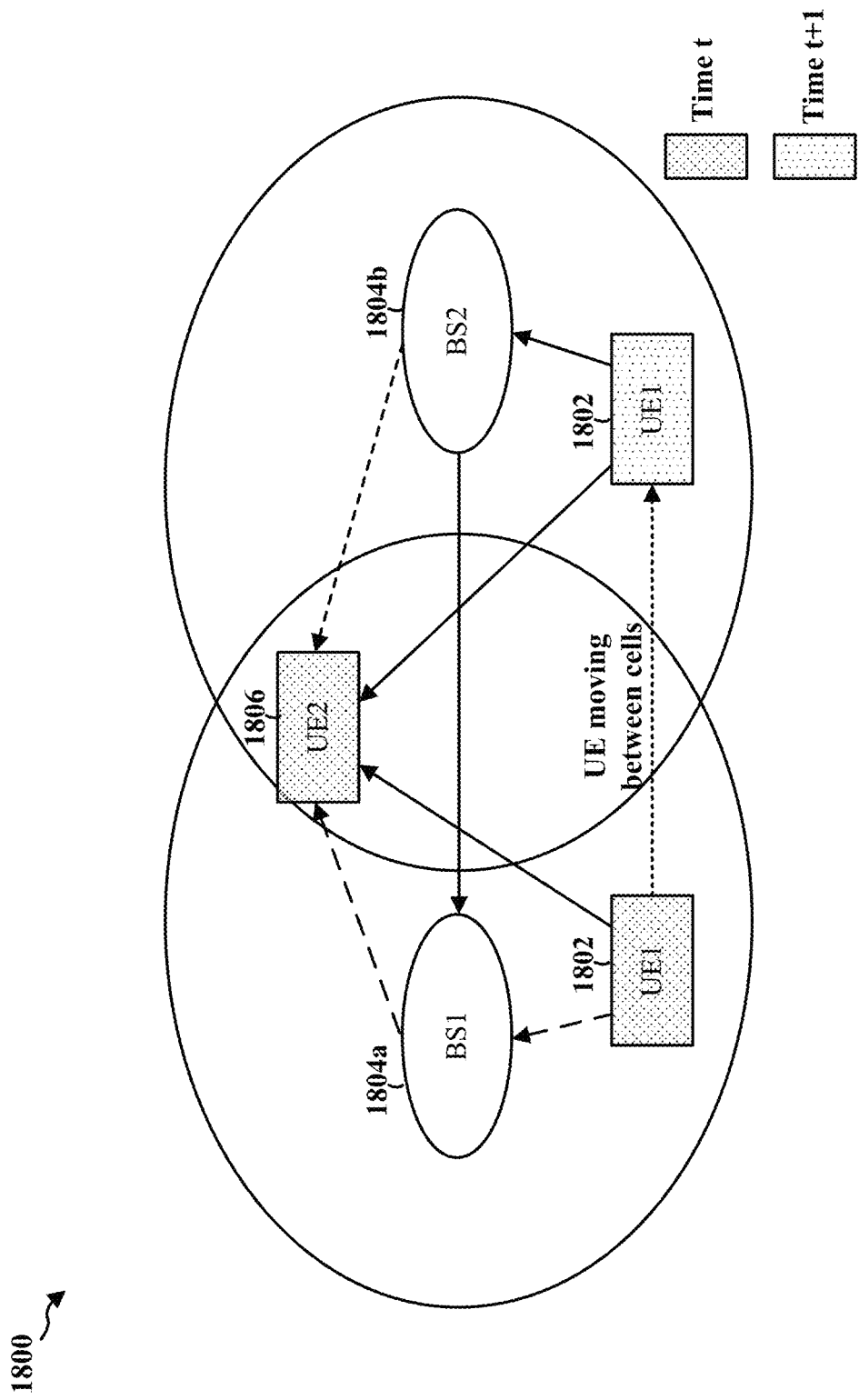
FIG. 18 is a diagram illustrating an example UE mobility and handover.

FIG. 18 is a diagram 1800 illustrating example UE mobility and handover. As illustrated in FIG. 18, a UE 1802 (UE1) may be moving between cells and may accordingly connect to a base station 1804a and then connect to another base station 1804b. The UE 1802 may also be connected, via a sidelink, with the UE 1806. While the UE 1802 switches the base station connection, the sidelink connection with the UE 1806 may not be interrupted. In some aspects, the UE 1806 may be an S/A and the UE 1802 may be a PLC. In some aspects, handover procedures may be performed so that the UE 1806 may handover to base station 1804b for communications related to the UE 1802.

Figure 19:
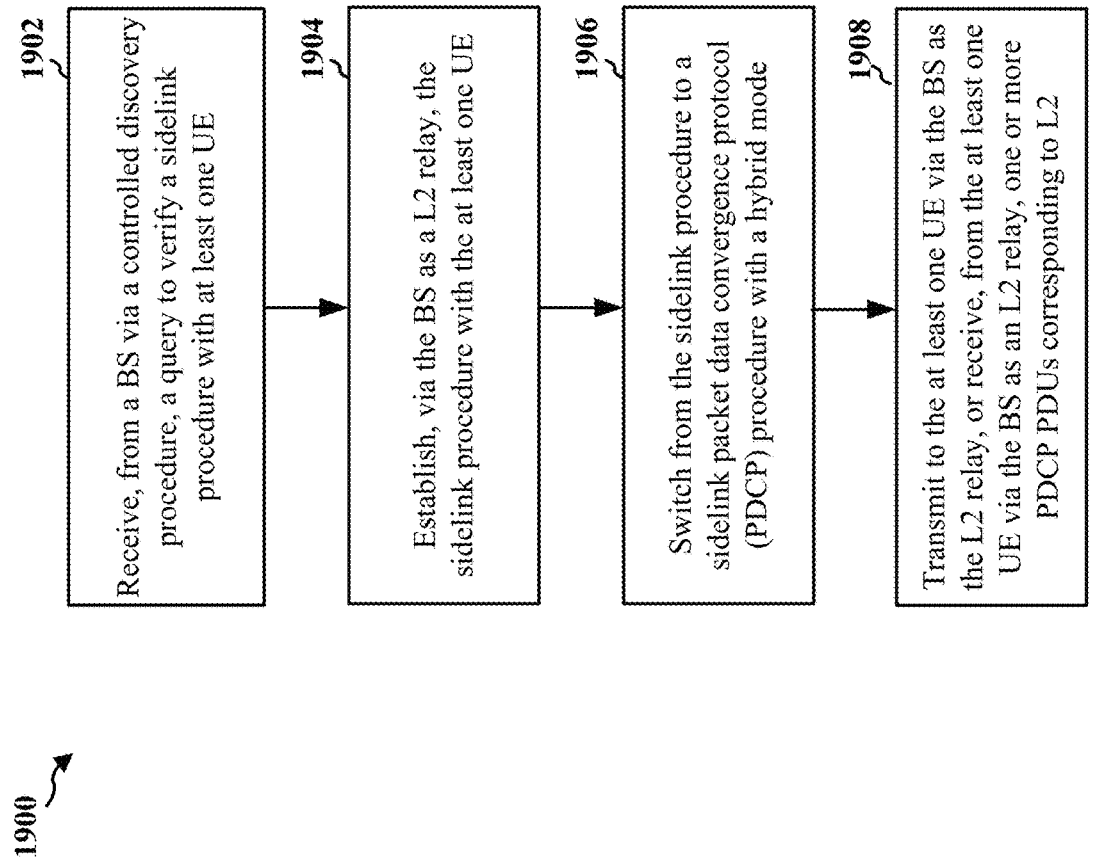
FIG. 19 is a flowchart of a method of wireless communication.

FIG. 19 is a flowchart 1900 of a method of wireless communication. The method may be performed by a UE (e.g., the UE 104, a UE, PLC, or S/A described in connection with any of FIGS. 4-18 such as the UE 1402, the UE 1404, the UE 1502, the UE 1504; the apparatus 2102).

At 1902, the UE may receive, from a BS via a controlled discovery procedure, a query to verify a SL procedure with at least one UE. In some aspects, 1902 may be performed by query component 2148 in FIG. 21. For example, as described in 1430 of FIG. 14, the UE 1402 or the UE 1404 may receive a query to verify a SL procedure with the UE 1404 or the UE 1402 from the base station 1406 via a controlled discovery procedure. In some aspects, the UE may correspond with a UE, PLC, or S/A described in connection with any of FIGS. 4-18 and the BS may correspond with a BS described in connection with any of FIGS. 4-18. In some aspects, the query may correspond with the query 1430 in FIG. 14. In some aspects, a communication between the UE and the base station is based on a Uu interface or a PC5 interface.

At 1904, the UE may establish, via the BS as a L2 relay, the SL procedure with the at least one UE. For example, as described in 1440a and 1440b in FIGS. 14 and 1536a and 1546b in FIG. 15, UE 1402, 1404, 1502, or 1404 may establish, via the BS as a L2 relay, the SL procedure with at least one UE. In some aspects, 1904 may be performed by sidelink component 2142 in FIG. 21. In some aspects, the establish may correspond with the establish 1440a or 1440b in FIG. 14, the establish 1536a and 1536b in FIG. 15, or the like.

At 1906, the UE may switch from the SL procedure to a SL PDCP procedure with a hybrid mode. For example, as described in connection with 1444 in FIGS. 14 and 1542 in FIG. 15, UE 1402, 1404, 1502, or 1404 may switch from the SL procedure to a SL PDCP procedure with a hybrid mode. In some aspects, the BS may be an L2 relay for the SL PDCP procedure. In some aspects, 1906 may be performed by sidelink component 2142 and Uu component 2146 in FIG. 21. In some aspects, the SL PDCP procedure may correspond with the SL hybrid procedure with full duplication mode, proactive BS fallback, or reactive BS fallback described in connection with any of FIGS. 4-18.

At 1908, the UE may transmit to the at least one UE via the BS as the L2 relay, or receive, from the at least one UE via the BS as an L2 relay, one or more PDCP PDUs corresponding to L2. For example, as described in connection with 1312b and 1332b in FIG. 13A, 1338 and 1348 in FIG. 13B, and 1384 in FIG. 13C, the UE 1302 may transmit to the at least one UE via the BS as the L2 relay, or receive, from the at least one UE via the BS as an L2 relay, one or more PDCP PDUs corresponding to L2. In some aspects, 1908 may be performed by PDU component 2146 in FIG. 21. In some aspects, the one or more PDCP PDUS may correspond with any PDU described in connection with FIGS. 13A-13C, FIG. 14, or FIG. 15.

Figure 20:
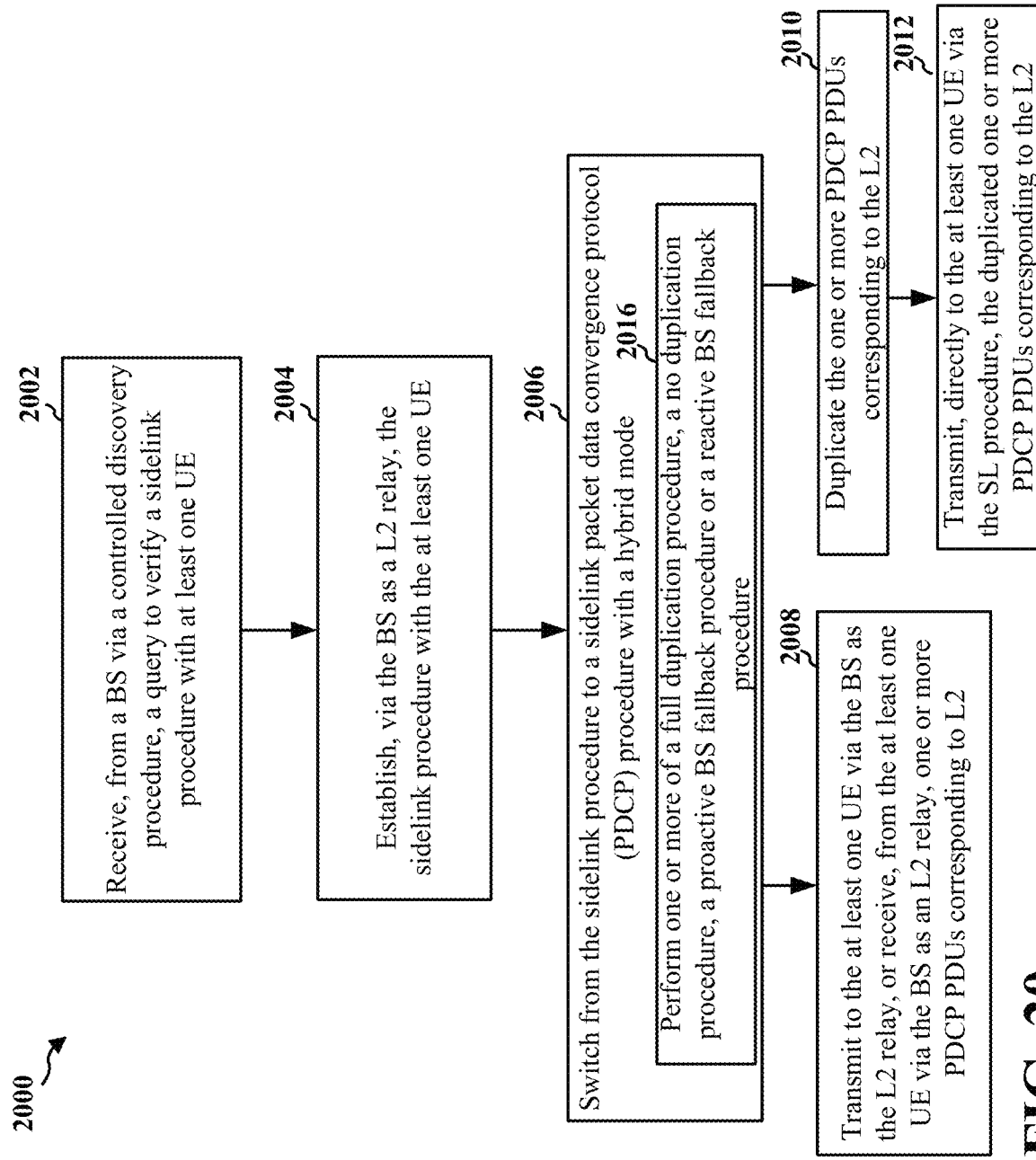
FIG. 20 is a flowchart of a method of wireless communication.

FIG. 20 is a flowchart 2000 of a method of wireless communication. The method may be performed by a UE (e.g., the UE 104, a UE, PLC, or S/A described in connection with FIGS. 4-18 such as the UE 1402, the UE 1404, the UE 1502, the UE 1504; the apparatus 2102).

At 2002, the UE may receive, from a BS via a controlled discovery procedure, a query to verify a SL procedure with at least one UE. For example, as described in 1430 of FIG. 14, the UE 1402 or the UE 1404 may receive a query from the base station 1406. For example, as described in 1430 of FIG. 14, the UE 1402 or the UE 1404 may receive a query to verify a SL procedure with the UE 1404 or the UE 1402 from the base station 1406 via a controlled discovery procedure. In some aspects, 2002 may be performed by query component 2148 in FIG. 21. In some aspects, the UE may correspond with a UE, PLC, or S/A described in connection with any of FIGS. 4-18 and the BS may correspond with a BS described in connection with any of FIGS. 4-18. In some aspects, the query may correspond with the query 1430 in FIG. 14. In some aspects, the UE may generate a service request such as the service request described in connection with 1524. In some aspects, the UE may additionally receive a verification request associated with the SL procedure from the BS.

At 2004, the UE may establish, via the BS as a L2 relay, the SL procedure with the at least one UE. For example, as described in 1440a and 1440b in FIGS. 14 and 1536a and 1546b in FIG. 15, UE 1402, 1404, 1502, or 1404 may establish, via the BS as a L2 relay, the SL procedure with at least one UE. In some aspects, 2004 may be performed by sidelink component 2142 in FIG. 21. In some aspects, the establish may correspond with the establish 1440a or 1440b in FIG. 14, the establish 1536a and 1536b in FIG. 15, or the like. In some aspects, as part of 2004, the UE may establish a PDU session with the at least one UE.

At 2006, the UE may switch from the SL procedure to a SL PDCP procedure with a hybrid mode. For example, as described in connection with 1444 in FIGS. 14 and 1542 in FIG. 15, UE 1402, 1404, 1502, or 1404 may switch from the SL procedure to a SL PDCP procedure with a hybrid mode. In some aspects, the BS may be an L2 relay for the SL PDCP procedure. In some aspects, 2006 may be performed by sidelink component 2142 and Uu component 2146 in FIG. 21. In some aspects, the SL PDCP procedure may correspond with the SL hybrid procedure with full duplication mode, proactive BS fallback, or reactive BS fallback described in connection with any of FIGS. 4-18. In some aspects, the one or more PDCP PDUs are transmitted via the BS as an L2 relay for a backup to a SL communication. For example, as previously described in connection with FIGS. 4-18, a two-hop path associated with the BS may be used as a backup for the sidelink procedure. In some aspects, the BS may be configured as the L2 relay for RLC or adaptation. In some aspects, as part of 2006, the UE may further determine whether to initiate a full duplication procedure, a proactive BS fallback, a reactive BS fallback, or a no-duplication with the at least one UE. For example, the UE may determine whether to initiate a reactive BS fallback procedure based at least in part on an RSRP measurement associated with the SL procedure or a QoS associated with the SL procedure. In another example, the UE may determine whether to initiate a proactive BS fallback procedure based at least in part on an RSRP measurement associated with the SL procedure or a QoS associated with the SL procedure. In another example, the UE may determine whether to initiate a full duplication procedure based at least in part on an RSRP measurement associated with the SL procedure or a QoS associated with the SL procedure. In some aspects, the UE may perform one or more of a proactive BS fallback procedure, a reactive BS fallback, a full duplication mode, or a no-duplication mode independent of an RSRP measurement associated with the SL procedure or a QoS associated with the SL procedure e.g., as previously described in connection with Hybrid-D. In some aspects, at 2016, the UE may perform one or more of a full duplication procedure, a no duplication procedure, a proactive BS fallback procedure, or a reactive BS fallback procedure based on a reference RSRP measurement or a QoS associated with the SL procedure, e.g., as previously described in connection with hybrid-S. In some aspects, the UE may perform one or more of a full duplication procedure, a no duplication procedure, a proactive BS fallback procedure, or a reactive BS fallback procedure based on received acknowledgment or non-acknowledgement associated with the SL procedure. For example, as previously described in connection with FIG. 13B, the UE 1302 may perform one or more of a full duplication procedure, a no duplication procedure, a proactive BS fallback procedure, or a reactive BS fallback procedure based on received acknowledgment or non-acknowledgement 1336 associated with the SL procedure. In some aspects, the SL procedure may be associated with a first latency and the L2 relay may be associated with a second latency, the second latency being higher than the first latency.

At 2008, the UE may transmit to the at least one UE via the BS as the L2 relay, or receive, from the at least one UE via the BS as an L2 relay, one or more PDCP PDUs corresponding to L2. For example, as described in connection with 1312b and 1332b in FIG. 13A, 1338 and 1348 in FIG. 13B, and 1384 in FIG. 13C, the UE 1302 may transmit to the at least one UE via the BS as the L2 relay, or receive, from the at least one UE via the BS as an L2 relay, one or more PDCP PDUs corresponding to L2. In some aspects, 2008 may be performed by PDU component 2146 in FIG. 21. In some aspects, the one or more PDCP PDUs may correspond with any PDU described in connection with FIGS. 13A-13C, FIG. 14, or FIG. 15.

At 2010, if the full duplication procedure, the proactive BS fallback, the reactive BS fallback is initiated, the UE may duplicate the one or more PDCP PDUs corresponding to the L2. For example, as described in connection with 1312a and 1312b in FIG. 13A, the UE 1302 may duplicate the duplicate the one or more PDCP PDUs corresponding to the L2. At 2012, the UE may transmit, directly to the at least one UE via the SL procedure, the duplicated one or more PDCP PDUs corresponding to the L2. For example, as described in connection with 1312a and 1312b in FIG. 13A, the UE 1302 may transmit the duplicated PDU 1312a corresponding to the L2 to the UE 1304. Under the proactive BS fallback, the UE may transmit the one or more PDCP PDUs to the at least one UE via the BS as the L2 relay independent of a RSRP measurement, e.g., as previously described in connection with FIG. 13A. Under the reactive BS fallback, the UE may transmit the one or more PDCP PDUs to the at least one UE via the BS as the L2 relay based on one of a RSRP measurement or a timer expiry associated with the direct transmission of the one or more PDCP PDUs, e.g., as previously described in connection with FIGS. 13B and 13C. For example, as described in connection with 1384 in FIG. 13C, the UE 1302 may transmit the one or more PDCP PDUs to the at least one UE via the BS as the L2 relay based on one of a RSRP measurement or a timer expiry associated with the direct transmission of the one or more PDCP PDUs.

Figure 22:
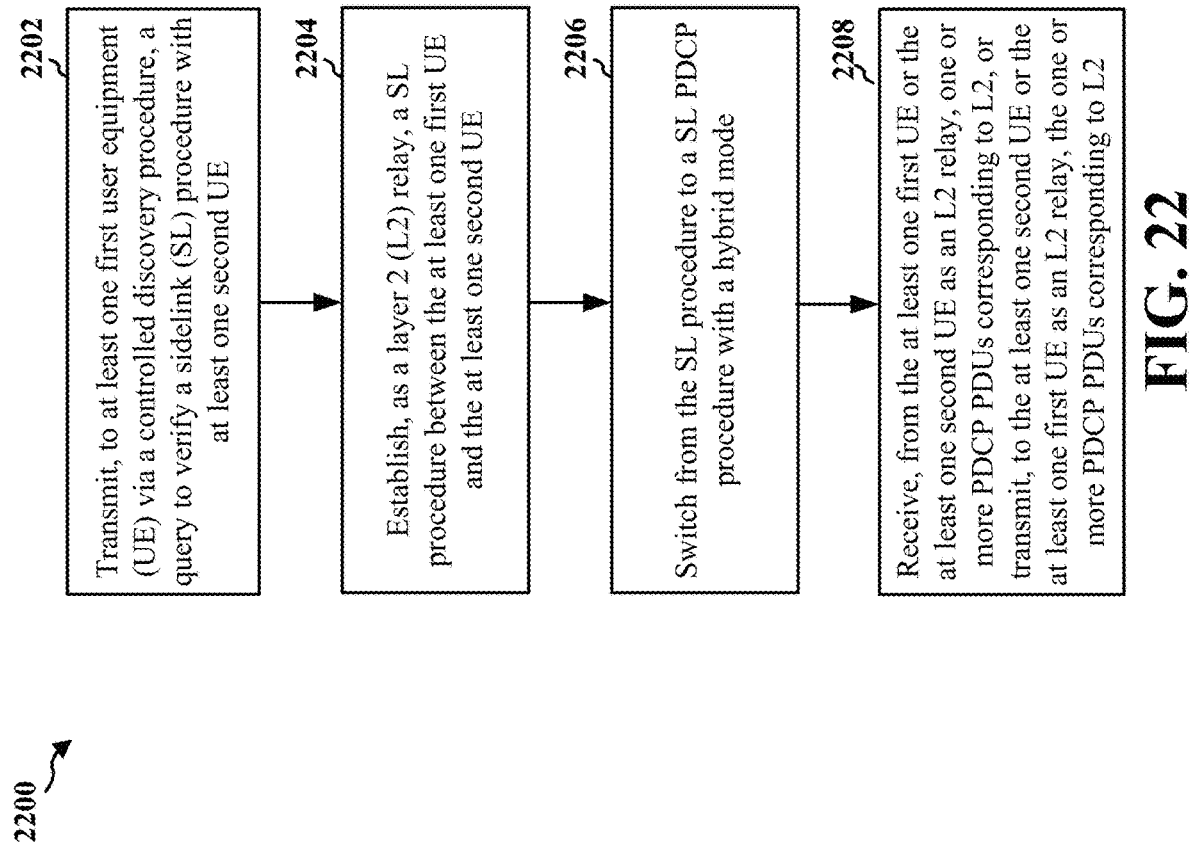
FIG. 22 is a flowchart of a method of wireless communication.

FIG. 22 is a flowchart 2200 of a method of wireless communication. The method may be performed by a base station (e.g., the BS 102/180, a BS described in connection with any of FIGS. 4-18 such as the BS 1406, the BS 1506, the apparatus 2402). The steps are not necessarily illustrated in chronological order.

At 2202, the BS may transmit, to at least one first UE via a controlled discovery procedure, a query to verify a SL procedure with at least one second UE. In some aspects, 2202 may be performed by query component 2446 in FIG. 21. For example, as described in 1430 of FIG. 14, the base station 1406 may transmit a query to verify a SL procedure to the UE 1404 or the UE 1402 via a controlled discovery procedure. In some aspects, the UE may correspond with a UE, PLC, or S/A described in connection with any of FIGS. 4-18 and the BS may correspond with a BS described in connection with any of FIGS. 4-18. In some aspects, the query may correspond with the query 1430 in FIG. 14.

At 2204, the BS may establish, as a L2 relay, the SL procedure between the at least one first UE and the at least one second UE. For example, as described in 1440*a* and 1440*b* in FIGS. 14 and 1536*a* and 1546*b* in FIG. 15, the BS 1406 and 1506 may establish, as a L2 relay, the SL procedure with at least one UE. In some aspects, 2204 may be performed by relay component 2442 in FIG. 21. In some aspects, the establish may correspond with the establish 1440*a* or 1440*b* in FIG. 14, the establish 1536*a* and 1536*b* in FIG. 15, or the like.

At 2206, the BS may switch from the SL procedure to a SL PDCP procedure with a hybrid mode. For example, as described in connection with 1444 in FIGS. 14 and 1542 in FIG. 15, BS 1406 and BS 1506 may switch from the SL procedure to a SL PDCP procedure with a hybrid mode. In some aspects, the BS may be an L2 relay for the SL PDCP procedure. In some aspects, 2206 may be performed by configuration component 2444 in FIG. 24. In some aspects, the SL PDCP procedure may correspond with the SL hybrid procedure with full duplication mode, proactive BS fallback, or reactive BS fallback described in connection with any of FIGS. 4-18.

At 2208, the BS may receive, from the at least one first UE or the at least one second UE as an L2 relay, one or more PDCP PDUs corresponding to L2, or transmit, to the at least one second UE or the at least one first UE as an L2 relay, the one or more PDCP PDUs corresponding to L2. In some aspects, 2208 may be performed by PDU component 2146 in FIG. 21. In some aspects, the one or more PDCP PDUS may correspond with any PDU described in connection with FIGS. 13A-13C, FIG. 14, or FIG. 15. The one or more PDCP PDUs may be received or transmitted via an adaptation layer at the BS, such as an adaptation layer previously described in connection with FIG. 10.

Figure 23:
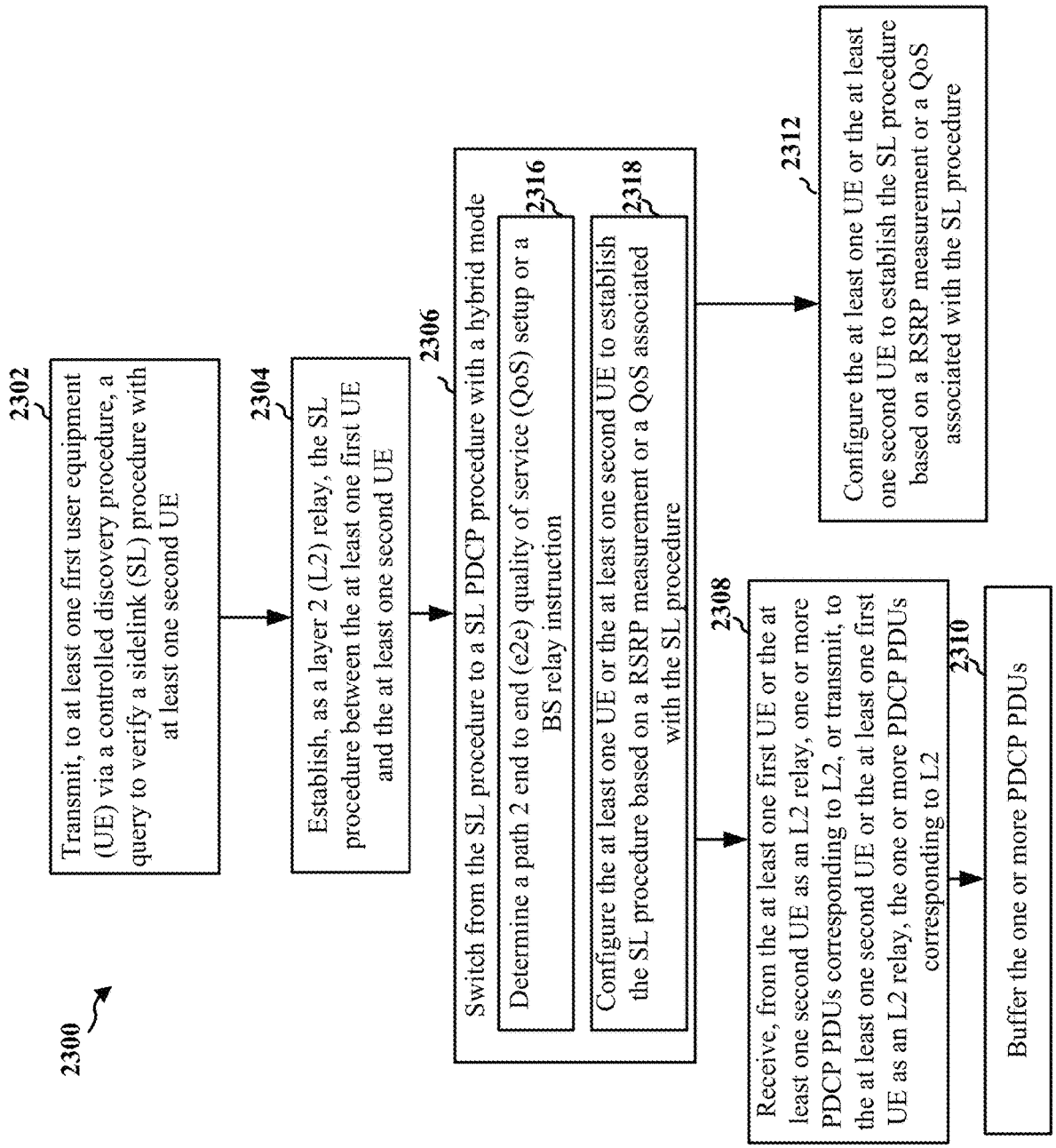
FIG. 23 is a flowchart of a method of wireless communication.

FIG. 23 is a flowchart 2300 of a method of wireless communication. The method may be performed by a UE (e.g., the UE 104, a UE, PLC, or S/A described in connection with any of FIGS. 4-18 such as the UE 1402, the UE 1404, the UE 1502, the UE 1504; the apparatus 2102).

At 2302, the BS may transmit, to at least one first UE via a controlled discovery procedure, a query to verify a SL procedure with at least one second UE. For example, as described in 1430 of FIG. 14, the base station 1406 may transmit a query to verify a SL procedure to the UE 1404 or the UE 1402 via a controlled discovery procedure. In some aspects, 2302 may be performed by query component 2446 in FIG. 21. In some aspects, the UE may correspond with a UE, PLC, or S/A described in connection with any of FIGS. 4-18 and the BS may correspond with a BS described in connection with any of FIGS. 4-18. In some aspects, the query may correspond with the query 1430 in FIG. 14.

At 2304, the BS may establish, as a L2 relay, the SL procedure between the at least one first UE and the at least one second UE. For example, as described in 1440*a* and 1440*b* in FIGS. 14 and 1536*a* and 1546*b* in FIG. 15, the BS 1406 and 1506 may establish, as a L2 relay, the SL procedure with at least one UE. In some aspects, 2304 may be performed by relay component 2442 in FIG. 21. In some aspects, the establish may correspond with the establish 1440*a* or 1440*b* in FIG. 14, the establish 1536*a* and 1536*b* in FIG. 15, or the like.

At 2306, the BS may switch from the SL procedure to a SL PDCP procedure with a hybrid mode. For example, as described in connection with 1444 in FIGS. 14 and 1542 in FIG. 15, BS 1406 and BS 1506 may switch from the SL procedure to a SL PDCP procedure with a hybrid mode. In some aspects, the BS may be an L2 relay for the SL PDCP procedure. In some aspects, 2306 may be performed by configuration component 2444 in FIG. 24. In some aspects, the SL PDCP procedure may correspond with the SL hybrid procedure with full duplication mode, proactive BS fallback, or reactive BS fallback described in connection with any of FIGS. 4-18. In some aspects, as part of 2306, at 2316, the BS may determine a path 2 e2e QoS set up or a BS relay instruction, e.g., as described in connection with 1438. In some aspects, as part of 2306, the BS may configure a RLC or an adaptation layer for the relay. In some aspects, the one or more PDCP PDUs are transmitted via the BS as an L2 relay for a backup to a SL communication. For example, as previously described in connection with FIGS. 4-18, a two-hop path associated with the BS may be used as a backup for the sidelink procedure. In some aspects, at 2318, the BS may configure the at least one UE or the at least one second UE to establish the SL procedure based on a RSRP measurement or a QoS associated with the SL procedure.

At 2308, the BS may receive, from the at least one first UE or the at least one second UE as an L2 relay, one or more PDCP PDUs corresponding to L2, or transmit, to the at least one second UE or the at least one first UE as an L2 relay, the one or more PDCP PDUs corresponding to L2. For example, as described in connection with 1312*b* and 1332*b* in FIG. 13A, 1338 and 1348 in FIG. 13B, and 1384 in FIG. 13C, the BS 1306 may transmit to the at least one UE via the BS as the L2 relay, or receive, from the at least one UE via the BS as an L2 relay, one or more PDCP PDUs corresponding to L2. In some aspects, 2308 may be performed by PDU component 2146 in FIG. 21. In some aspects, the one or more PDCP PDUS may correspond with any PDU described in connection with FIGS. 13A-13C, FIG. 14, or FIG. 15. The one or more PDCP PDUs may be received or transmitted via an adaptation layer at the BS, such as an adaptation layer previously described in connection with FIG. 10. In some aspects, one or more RLC channels associated with the transmission of the one or more PDCP PDUs may one to one correspond with one or more RLC channels associated with the reception of the one or more PDCP PDUs, e.g., as described in connection with FIG. 10.

In some aspects, at 2310, the BS may buffer the one or more PDCP PDUs, e.g., as previously described in connection with FIG. 13A. For example, as described in connection with FIG. 13A, the BS 1306 may buffer the one or more PDCP PDUs. In some aspects, 2310 may be performed by buffer component 2448. In some aspects, at 2312, the BS may configure the at least one UE or the at least one second UE to establish the SL procedure based on a RSRP measurement or a QoS associated with the SL procedure. For example, as described in connection with 1714, 1716, and 1718 in FIG. 17, the base station 1706 may configure the at least one UE or the at least one second UE to establish the SL procedure based on a RSRP measurement or a QoS associated with the SL procedure. In some aspects, transmit, to the at least one second UE or the at least one first UE as an L2 relay, the one or more PDCP PDUs may be based on a RSRP measurement or a QoS associated with the SL procedure.

Figure 21:
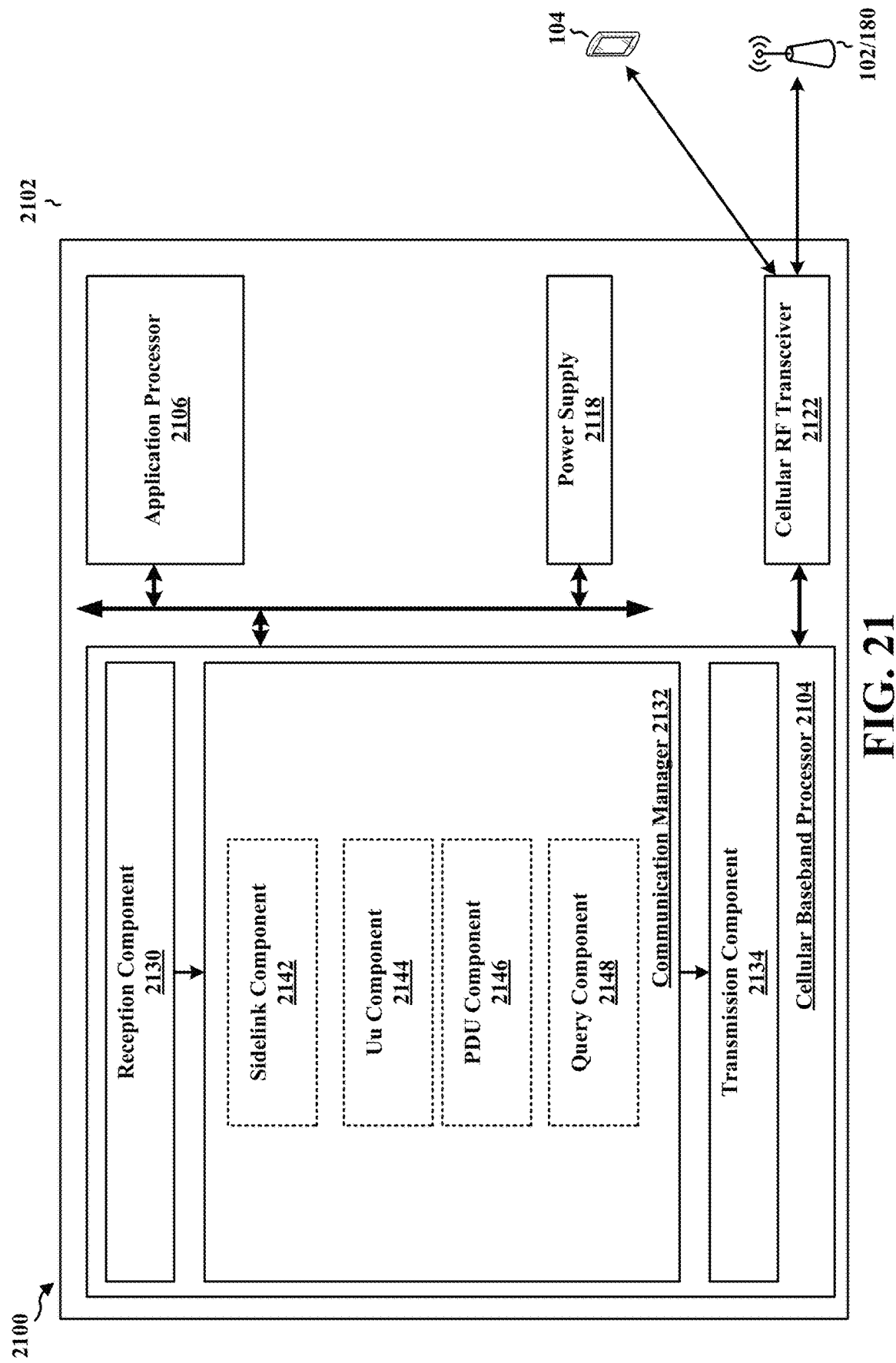
FIG. 21 is a diagram illustrating an example of a hardware implementation for an example apparatus.

FIG. 21 is a diagram 2100 illustrating an example of a hardware implementation for an apparatus 2102. The apparatus 2102 is a UE and includes a cellular baseband processor 2104 (also referred to as a modem) coupled to a cellular RF transceiver 2122 and one or more subscriber identity modules (SIM) cards, an application processor 2106 that may be coupled to a secure digital (SD) card and a screen, a Bluetooth module, a wireless local area network (WLAN) module, a Global Positioning System (GPS) module, and a power supply 2118. In some aspects, the apparatus 2102 may not include the SD card, the screen, the Bluetooth module, the WLAN module, the GPS module in order to save power. The cellular baseband processor 2104 communicates through the cellular RF transceiver 2122 with the UE 104 and/or BS 102/180. The cellular baseband processor 2104 may include a computer-readable medium/memory. The computer-readable medium/memory may be non-transitory. The cellular baseband processor 2104 is responsible for general processing, including the execution of software stored on the computer-readable medium/memory. The software, when executed by the cellular baseband processor 2104, causes the cellular baseband processor 2104 to perform the various functions described supra. The computer-readable medium/memory may also be used for storing data that is manipulated by the cellular baseband processor 2104 when executing software. The cellular baseband processor 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the cellular baseband processor 2104. The cellular baseband processor 2104 may be a component of the UE 350 and may include the memory 360 and/or at least one of the TX processor 368, the RX processor 356, and the controller/processor 359. In one configuration, the apparatus 2102 may be a modem chip and include just the baseband processor 2104, and in another configuration, the apparatus 2102 may be the entire UE (e.g., see 350 of FIG. 3) and include the aforediscussed additional modules of the apparatus 2102.

The communication manager 2132 may include a sidelink component 2142 that may be configured to establish the SL procedure with the at least one UE, e.g., as described in connection with 1904 in FIGS. 19 and 2004 in FIG. 20. The communication manager 2132 may further include a Uu component 2144 that may be configured to switch from the SL procedure to a SL PDCP procedure with a hybrid mode, wherein the BS is an L2 relay for the SL PDCP procedure, e.g., as described in connection with 1906 in FIGS. 19 and 2006 in FIG. 20. The communication manager 2132 may further include a PDU component 2146 that may be configured to transmit to the at least one UE via the BS as the L2 relay, or receive, from the at least one UE via the BS as an L2 relay, one or more PDCP PDUs corresponding to L2, e.g., as described in connection with 1908 in FIGS. 19 and 2008 in FIG. 20. The communication manager 2132 may further include a query component 2146 that may be configured to receive, from a BS via a controlled discovery procedure, a query to verify a SL procedure with at least one UE, e.g., as described in connection with 1902 in FIGS. 19 and 2002 in FIG. 20.

The apparatus may include additional components that perform each of the blocks of the algorithm in the aforementioned flowcharts of FIGS. 19 and 20. As such, each block in the aforementioned flowcharts of FIGS. 19 and 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2102, and in particular the cellular baseband processor 2104, may include means for receiving, from a BS via a controlled discovery procedure, a query to verify a SL procedure with at least one UE. The cellular baseband processor 2104 may further include means for establishing, via the BS as a L2 relay, the SL procedure with the at least one UE. The cellular baseband processor 2104 may further include means for switching from the SL procedure to a SL PDCP procedure with a hybrid mode, wherein the BS is an L2 relay for the SL PDCP procedure. The cellular baseband processor 2104 may further include means for transmitting to the at least one UE via the BS as the L2 relay, or receiving, from the at least one UE via the BS as an L2 relay, one or more PDCP PDUs corresponding to L2. The cellular baseband processor 2104 may further include means for duplicating the one or more PDCP PDUs corresponding to the L2. The cellular baseband processor 2104 may further include means for transmitting, directly to the at least one UE via the SL procedure, the duplicated one or more PDCP PDUs corresponding to the L2. The cellular baseband processor 2104 may further include means for receiving, from the BS, a verification request associated with the SL procedure. The cellular baseband processor 2104 may further include means for performing one or more of a full duplication procedure, a no duplication procedure, a proactive BS fallback procedure, or a reactive BS fallback procedure. The cellular baseband processor 2104 may further include means for generating a service request to establish the SL procedure with the at least one UE.

The aforementioned means may be one or more of the aforementioned components of the apparatus 2102 configured to perform the functions recited by the aforementioned means. As described supra, the apparatus 2102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 24:
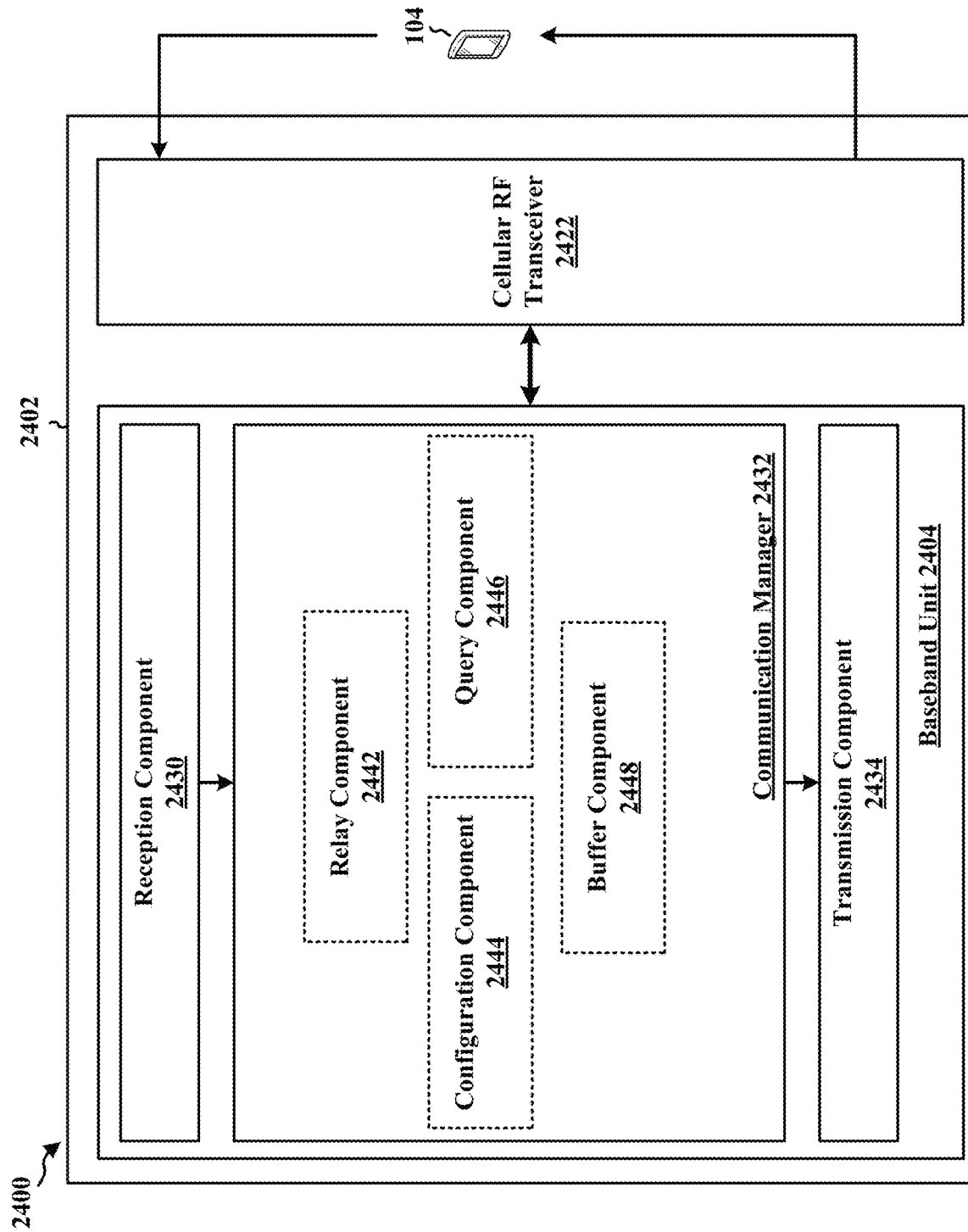
FIG. 24 is a diagram illustrating an example of a hardware implementation for an example apparatus.

FIG. 24 is a diagram 2400 illustrating an example of a hardware implementation for an apparatus 2402. The apparatus 2402 is a BS and includes a baseband unit 2404. The baseband unit 2404 may communicate through a cellular RF transceiver 2422 with the UE 104. The baseband unit 2404 may include a computer-readable medium/memory. The baseband unit 2404 is responsible for general processing, including the execution of software stored on the computer-readable medium/memory. The software, when executed by the baseband unit 2404, causes the baseband unit 2404 to perform the various functions described supra. The computer-readable medium/memory may also be used for storing data that is manipulated by the baseband unit 2404 when executing software. The baseband unit 2404 further includes a reception component 2430, a communication manager 2432, and a transmission component 2434. The communication manager 2432 includes the one or more illustrated components. The components within the communication manager 2432 may be stored in the computer-readable medium/memory and/or configured as hardware within the baseband unit 2404. The baseband unit 2404 may be a component of the BS 310 and may include the memory 376 and/or at least one of the TX processor 316, the RX processor 370, and the controller/processor 375.

The communication manager 2432 may include a relay component 2442 that may be configured to establish, as a L2 relay, the SL procedure between the at least one first UE and the at least one second UE, e.g., as described in connection with 2204 in FIGS. 22 and 2304 in FIG. 23. The communication manager 2432 may further include a configuration component 2444 that may be configured to switch from the SL procedure to a SL PDCP procedure with a hybrid mode, e.g., as described in connection with 2206 in FIGS. 22 and 2306 in FIG. 23. The communication manager 2432 may further include a query component 2446 that may be configured to transmit, to at least one first UE via a controlled discovery procedure, a query to verify a SL procedure with at least one second UE, e.g., as described in connection with 2202 in FIGS. 22 and 2302 in FIG. 23. The communication manager 2432 may further include a buffer component 2448 that may be configured to buffer the one or more PDCP PDUs, e.g., as described in connection with 2310 in FIG. 23.

The apparatus may include additional components that perform each of the blocks of the algorithm in the aforementioned flowcharts of FIGS. 22 and 23. As such, each block in the aforementioned flowcharts of FIGS. 22 and 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2402, and in particular the baseband unit 2404, may include means for transmitting, to at least one first UE via a controlled discovery procedure, a query to verify a SL procedure with at least one second UE. The baseband unit 2404 may further include means for establishing, as a L2 relay, a SL procedure between the at least one first UE and the at least one second UE. The baseband unit 2404 may further include means for switching from the SL procedure to a SL PDCP procedure with a hybrid mode, the BS being an L2 relay for the SL PDCP procedure with the hybrid mode. The baseband unit 2404 may further include means for receiving, from the at least one first UE or the at least one second UE as an L2 relay, one or more PDCP PDUs corresponding to L2, or transmitting, to the at least one second UE or the at least one first UE as an L2 relay. The baseband unit 2404 may further include means for determining a path 2 e2e QoS setup or a BS relay instruction. The baseband unit 2404 may further include means for configuring a RLC or an adaptation layer for the L2 relay. The baseband unit 2404 may further include means for configuring the at least one UE or the at least one second UE to establish the SL procedure based on a RSRP measurement or a QoS associated with the SL procedure. The baseband unit 2404 may further include means for configuring the at least one UE or the at least one second UE to terminate the SL procedure based on a RSRP measurement or a QoS associated with the SL procedure. The baseband unit 2404 may further include means for buffering the one or more PDCP PDUs.

The aforementioned means may be one or more of the aforementioned components of the apparatus 2402 configured to perform the functions recited by the aforementioned means. As described supra, the apparatus 2402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive, from a BS via a controlled discovery procedure, a query to verify a SL procedure with at least one UE; establish, via the BS as a L2 relay, the SL procedure with the at least one UE; switch from the SL procedure to a SL PDCP procedure with a hybrid mode, the BS being an L2 relay for the SL PDCP procedure; and transmit, to the at least one UE via the BS as the L2 relay, or receive, from the at least one UE via the BS as an L2 relay, one or more PDUs corresponding to L2, the one or more PDCP PDUs being transmitted or received via an adaptation layer at the BS.

Aspect 2 is the apparatus of aspect 1, wherein the memory and the at least one processor coupled to the memory are further configured to establish a PDU session with the at least one UE.

Aspect 3 is the apparatus of any of aspects 1-2, wherein the one or more PDCP PDUs are transmitted via the BS as an L2 relay for a backup to a SL communication.

Aspect 4 is the apparatus of aspect 1, wherein the BS is configured as the L2 relay for RLC or adaptation.

Aspect 5 is the apparatus of any of aspects 1-3, wherein a communication between the UE and the base station is based on a Uu interface or a PC5 interface.

Aspect 6 is the apparatus of any of aspects 1-5, wherein the memory and the at least one processor coupled to the memory are further configured to determine whether to initiate a full duplication procedure with the at least one UE.

Aspect 7 is the apparatus of any of aspects 1-6, wherein to perform the full duplication procedure, the memory and the at least one processor coupled to the memory are further configured to: duplicate the one or more PDCP PDUs corresponding to the L2; and transmit, directly to the at least one UE via the SL procedure, the duplicated one or more PDCP PDUs corresponding to the L2.

Aspect 8 is the apparatus of any of aspects 1-7, wherein the determination whether to initiate the full duplication procedure is based on an RSRP measurement associated with the SL procedure or a QoS associated with the SL procedure.

Aspect 9 is the apparatus of any of aspects 1-8, wherein the memory and the at least one processor coupled to the memory are further configured to determine whether to initiate a proactive BS fallback procedure based at least in part on an RSRP measurement associated with the SL procedure or a QoS associated with the SL procedure.

Aspect 10 is the apparatus of any of aspects 1-9, wherein to perform the proactive BS fallback procedure, the memory and the at least one processor coupled to the memory are further configured to: duplicate the one or more PDCP PDUs corresponding to the L2; transmit, directly to the at least one UE, the duplicated one or more PDCP PDUs corresponding to the L2; and transmit the one or more PDCP PDUs to the at least one UE via the BS as the L2 relay independent of a RSRP measurement.

Aspect 11 is the apparatus of any of aspects 1-10, wherein the memory and the at least one processor coupled to the memory are further configured to determine whether to initiate a reactive BS fallback procedure based at least in part on an RSRP measurement associated with the SL procedure or a QoS associated with the SL procedure.

Aspect 12 is the apparatus of any of aspects 1-11, wherein to perform the reactive BS fallback procedure, the memory and the at least one processor coupled to the memory are further configured to: duplicate the one or more PDCP PDUs corresponding to the L2; transmit, directly to the at least one UE, the duplicated one or more PDCP PDUs corresponding to the L2; and transmit the one or more PDCP PDUs to the at least one UE via the BS as the L2 relay based on one of a RSRP measurement or a timer expiry associated with the direct transmission of the one or more PDCP PDUs.

Aspect 13 is the apparatus of any of aspects 1-12, wherein the apparatus is configured to perform one or more of a full duplication procedure, a no duplication procedure, a proactive BS fallback procedure, or a reactive BS fallback procedure independent of an RSRP measurement associated with the SL procedure or a QoS associated with the SL procedure.

Aspect 14 is the apparatus of any of aspects 1-13, wherein the memory and the at least one processor coupled to the memory are further configured to: perform one or more of a full duplication procedure, a no duplication procedure, a proactive BS fallback procedure, or a reactive BS fallback procedure based on a RSRP measurement or a QoS associated with the SL procedure.

Aspect 15 is the apparatus of any of aspects 1-14, wherein the memory and the at least one processor coupled to the memory are further configured to: perform one or more of a full duplication procedure, a no duplication procedure, a proactive BS fallback procedure, or a reactive BS fallback procedure based on a received ACK or NACK associated with the SL procedure.

Aspect 16 is the apparatus of any of aspects 1-15, wherein the memory and the at least one processor coupled to the memory are further configured to: receive, from the BS, a verification request associated with the SL procedure.

Aspect 17 is the apparatus of any of aspects 1-16, wherein the memory and the at least one processor coupled to the memory are further configured to: generate a service request to establish the SL procedure with the at least one UE.

Aspect 18 is the apparatus of any of aspects 1-17, wherein the SL procedure is associated with a first latency and the L2 relay is associated with a second latency, the second latency being higher than the first latency.

Aspect 19 is the apparatus of any of aspects 1-18, wherein the at least one UE comprises a S/A.

Aspect 20 is an apparatus for wireless communication at a BS, comprising: a memory; and at least one processor coupled to the memory and configured to: transmit, to at least one first UE via a controlled discovery procedure, a query to verify a SL procedure with at least one second UE; establish, as a L2 relay, a SL procedure between the at least one first UE and the at least one second UE; switch from the SL procedure to a SL PDCP procedure with a hybrid mode, the BS being an L2 relay for the SL PDCP procedure with the hybrid mode; and receive, from the at least one first UE or the at least one second UE as an L2 relay, one or more PDCP PDUs corresponding to L2, or transmit, to the at least one second UE or the at least one first UE as an L2 relay, the one or more PDCP PDUs corresponding to L2, the one or more PDCP PDUs being received or transmitted via an adaptation layer at the BS.

Aspect 21 is the apparatus of aspect 20, wherein the memory and the at least one processor coupled to the memory are further configured to: determine a path 2 e2e QoS setup or a BS relay instruction.

Aspect 22 is the apparatus of any of aspects 20-21, wherein the memory and the at least one processor coupled to the memory are further configured to: configure a RLC or an adaptation layer for the L2 relay.

Aspect 23 is the apparatus of any of aspects 20-22, wherein the one or more first PDCP PDUs are received or transmitted as an L2 relay for a backup to the SL procedure.

Aspect 24 is the apparatus of any of aspects 20-23, wherein the memory and the at least one processor coupled to the memory are further configured to: configure the at least one UE or the at least one second UE to establish the SL procedure based on a RSRP measurement or a QoS associated with the SL procedure.

Aspect 25 is the apparatus of any of aspects 20-24, wherein the memory and the at least one processor coupled to the memory are further configured to: configure the at least one UE or the at least one second UE to terminate the SL procedure based on a RSRP measurement or a QoS associated with the SL procedure.

Aspect 26 is the apparatus of any of aspects 20-25, wherein one or more RLC channels associated with the transmission of the one or more PDCP PDUs one-to-one correspond with one or more RLC channels associated with the reception of the one or more PDCP PDUs.

Aspect 27 is the apparatus of any of aspects 20-26, wherein the memory and the at least one processor coupled to the memory are further configured to: buffer the one or more PDCP PDUs; wherein the transmission of the one or more PDCP PDUs is based on a reception of a request associated with the one or more PDCP PDUs.

Aspect 28 is the apparatus of any of aspects 20-27, wherein the transmission of the one or more PDCP PDUs is based on a RSRP measurement or a QoS associated with the SL procedure.

Aspect 29 is a method of wireless communication for implementing any of aspects 1 to 19.

Aspect 30 is an apparatus for wireless communication including means for implementing any of aspects 1 to 19.

Aspect 31 is a computer-readable medium storing computer executable code, where the code when executed by a processor causes the processor to implement any of aspects 1 to 19.

Aspect 32 is a method of wireless communication for implementing any of aspects 20 to 28.

Aspect 33 is an apparatus for wireless communication including means for implementing any of aspects 20 to 28.

Aspect 34 is a computer-readable medium storing computer executable code, where the code when executed by a processor causes the processor to implement any of aspects 20 to 28.

What is claimed is:

1. An apparatus for wireless communication at a user equipment (UE), comprising:
    memory; and
    at least one processor coupled to the memory and configured to:
        receive, from a base station (BS) via a controlled discovery procedure, a query to verify a reference signal received power (RSRP) measurement or a quality of service (QOS) associated with a direct connection between the UE and at least one other UE;
        establish, using the BS as a layer 2 (L2) relay, the direct connection with the at least one other UE;
        switch from the direct connection to an indirect connection between the UE and the at least one other UE via the BS; and
        transmit, to an adaptation layer at the BS based on the switch, or receive, from the adaptation layer at the BS based on the switch, one or more PDCP protocol data unit (PDUs) corresponding to L2, the one or more PDCP PDUs being part of a communication between the UE and the at least one other UE.

2. The apparatus of claim 1, wherein the memory and the at least one processor coupled to the memory are further configured to establish a PDU session with the at least one other UE.

3. The apparatus of claim 1, wherein to transmit the one or more PDCP PDUs, the memory and the at least one processor coupled to the memory are configured to transmit the one or more PDCP PDUs to the BS for a backup to the direct connection.

4. The apparatus of claim 1, wherein the apparatus is configured to use the BS as the L2 relay for radio link control (RLC) or adaptation.

5. The apparatus of claim 1, wherein the transmission to the adaptation layer of the BS or the reception from the adaptation layer of the BS is based on a Uu interface or a PC5 interface.

6. The apparatus of claim 1, wherein the memory and the at least one processor coupled to the memory are further configured to determine whether to initiate a full duplication procedure with the at least one other UE.

7. The apparatus of claim 6, wherein to perform the full duplication procedure, the memory and the at least one processor coupled to the memory are further configured to:
    duplicate the one or more PDCP PDUs corresponding to the L2; and
    transmit, directly to the at least one other UE via the direct connection, the duplicated one or more PDCP PDUs corresponding to the L2.

8. The apparatus of claim 6, wherein the determination whether to initiate the full duplication procedure is based on the RSRP measurement or the QoS.

9. The apparatus of claim 1, wherein the memory and the at least one processor coupled to the memory are further configured to determine whether to initiate a proactive BS fallback procedure based at least in part on the RSRP measurement or the QoS.

10. The apparatus of claim 9, wherein to perform the proactive BS fallback procedure, the memory and the at least one processor coupled to the memory are further configured to:
    duplicate the one or more PDCP PDUs corresponding to the L2;
    transmit, directly to the at least one UE, the duplicated one or more PDCP PDUs corresponding to the L2; and
    transmit the one or more PDCP PDUs to the at least one UE via the BS as the L2 relay independent of the RSRP measurement.

11. The apparatus of claim 1, wherein the memory and the at least one processor coupled to the memory are further configured to determine whether to initiate a reactive BS fallback procedure based at least in part on the RSRP measurement or the QoS.

12. The apparatus of claim 11, wherein to perform the reactive BS fallback procedure, the memory and the at least one processor coupled to the memory are further configured to:
    duplicate the one or more PDCP PDUs corresponding to the L2;
    transmit, directly to the at least one other UE, the duplicated one or more PDCP PDUs corresponding to the L2; and transmit the one or more PDCP PDUs to the at least one other UE via the BS as the L2 relay based on one of the RSRP measurement or a timer expiry associated with a transmission of the one or more PDCP PDUs via the direct connection.

13. The apparatus of claim 1, wherein the apparatus is configured to perform one or more of a full duplication procedure, a no duplication procedure, a proactive BS fallback procedure, or a reactive BS fallback procedure independent of the RSRP measurement or the QoS.

14. The apparatus of claim 1, wherein the memory and the at least one processor coupled to the memory are further configured to:
perform one or more of a full duplication procedure, a no duplication procedure, a proactive BS fallback procedure, or a reactive BS fallback procedure based on the RSRP measurement or the QoS.

15. The apparatus of claim 1, wherein the memory and the at least one processor coupled to the memory are further configured to:
perform one or more of a full duplication procedure, a no duplication procedure, a proactive BS fallback procedure, or a reactive BS fallback procedure based on a received acknowledgment (ACK) or negative ACK (NACK) associated with the direct connection.

16. The apparatus of claim 1, wherein the memory and the at least one processor coupled to the memory are further configured to:
receive, from the BS, a verification request associated with the direct connection.

17. The apparatus of claim 1, wherein the memory and the at least one processor coupled to the memory are further configured to:
generate a service request to establish the direct connection with the at least one other UE.

18. The apparatus of claim 1, wherein the direct connection is associated with a first latency and the L2 relay is associated with a second latency, the second latency being higher than the first latency.

19. The apparatus of claim 1, wherein the at least one other UE comprises at least one sensor/actuator (S/A).

20. An apparatus for wireless communication at a base station (BS), comprising:
memory; and
at least one processor coupled to the memory and configured to:
transmit, to at least one first user equipment (UE) via a controlled discovery procedure, a query to verify a reference signal received power (RSRP) measurement or a quality of service (QOS) associated with a direct connection between the at least one first UE and at least one second UE;
establish, as a layer 2 (L2) relay, the direct connection between the at least one first UE and the at least one second UE; and
receive, from one of the at least one first UE or the at least one second UE, one or more PDCP PDUs corresponding to L2, and transmit, to another one of the at least one second UE or the at least one first UE, the one or more PDCP PDUs corresponding to L2, the one or more PDCP PDUs being received and transmitted via an adaptation layer at the BS based on a switch of a connection between the at least one first UE and the at least one second UE.

21. The apparatus of claim 20, wherein the memory and the at least one processor coupled to the memory are further configured to:
determine a path 2 end-to-end (e2e) quality of service (QOS) setup or a BS relay instruction.

22. The apparatus of claim 20, wherein the memory and the at least one processor coupled to the memory are further configured to:
configure a radio link control (RLC) or the adaptation layer to transmit or receive the one or more PDCP PDUs.

23. The apparatus of claim 20, wherein to receive or transmit the one or more PDCP PDUs, the memory and the at least one processor coupled to the memory are configured to receive or transmit the one or more first PDCP PDUs as an L2 relay for a backup to the direct connection.

24. The apparatus of claim 20, wherein the memory and the at least one processor coupled to the memory are further configured to:
configure the at least one first UE or the at least one second UE to establish the direct connection based on the RSRP or the QoS.

25. The apparatus of claim 20, wherein the memory and the at least one processor coupled to the memory are further configured to:
configure the at least one first UE or the at least one second UE to terminate the direct connection based on the RSRP or the QoS.

26. The apparatus of claim 20, wherein one or more radio link control (RLC) channels associated with the transmission of the one or more PDCP PDUs one-to-one correspond with one or more RLC channels associated with the reception of the one or more PDCP PDUs.

27. The apparatus of claim 20, wherein the memory and the at least one processor coupled to the memory are further configured to:
buffer the one or more PDCP PDUs;
wherein the transmission of the one or more PDCP PDUs is based on a reception of a request associated with the one or more PDCP PDUs.

28. The apparatus of claim 20, wherein the transmission of the one or more PDCP PDUs is based on the RSRP measurement or the QoS.

29. A method for wireless communication at a user equipment (UE), comprising:
receiving, from a base station (BS) via a controlled discovery procedure, a query to verify a reference signal received power (RSRP) measurement or a quality of service (QOS) associated with a direct connection between the UE and at least one other UE;
establishing, using the BS as a layer 2 (L2) relay, the direct connection with the at least one other UE;
switching from the direct connection to an indirect connection between the UE and the at least one other UE via the BS; and
transmitting, to an adaptation layer at the BS based on the switch, or receive, from the adaptation layer at the BS based on the switch, one or more PDCP protocol data unit (PDUs) corresponding to L2, the one or more PDCP PDUs being part of a communication between the UE and the at least one other UE.

30. A method for wireless communication at a base station (BS), comprising:
transmitting, to at least one first user equipment (UE) via a controlled discovery procedure, a query to verify a reference signal received power (RSRP) measurement or a quality of service (QOS) associated with a direct connection between the at least one first UE and at least one second UE;

establishing, as a layer 2 (L2) relay, the direct connection between the at least one first UE and the at least one second UE; and receiving, from one of the at least one first UE or the at least one second UE, one or more PDCP PDUs corresponding to L2, and transmit, to another one of the at least one second UE or the at least one first UE, the one or more PDCP PDUs corresponding to L2, the one or more PDCP PDUs being received or transmitted via an adaptation layer at the BS based on a switch of a connection between the at least one first UE and the at least one second UE.

* * * * *